(12) United States Patent
Toye

(10) Patent No.: US 10,750,680 B2
(45) Date of Patent: Aug. 25, 2020

(54) WOVEN SHEET CROP PROTECTION MATERIAL

(71) Applicant: Nine IP Limited, Auckland (NZ)

(72) Inventor: Jonathan Dallas Toye, Auckland (NZ)

(73) Assignee: NINE IP LIMITED, Auckland (NZ)

( * ) Notice: Subject to any disclaimer, the term of this patent is extended or adjusted under 35 U.S.C. 154(b) by 159 days.

(21) Appl. No.: 15/739,448

(22) PCT Filed: Jul. 1, 2016

(86) PCT No.: PCT/IB2016/053955
§ 371 (c)(1),
(2) Date: Dec. 22, 2017

(87) PCT Pub. No.: WO2017/002082
PCT Pub. Date: Jan. 5, 2017

(65) Prior Publication Data
US 2018/0206419 A1    Jul. 26, 2018

(30) Foreign Application Priority Data
Jul. 2, 2015    (NZ) ........................................ 709671

(51) Int. Cl.
*A01G 13/02* (2006.01)
*D03D 1/00* (2006.01)
*D03D 5/00* (2006.01)
*D03D 13/00* (2006.01)

(52) U.S. Cl.
CPC ......... *A01G 13/0206* (2013.01); *D03D 1/007* (2013.01); *D03D 5/00* (2013.01); *D03D 13/006* (2013.01); *D03D 2700/0122* (2013.01)

(58) Field of Classification Search
CPC .... A01G 13/00; A01G 13/02; A01G 13/0206; A01G 13/0212; A01G 13/0256; A01G 13/0268
See application file for complete search history.

(56) References Cited

U.S. PATENT DOCUMENTS

| | | | |
|---|---|---|---|
| 10,285,338 B2 * | 5/2019 | Toye | A45F 3/52 |
| 2015/0351330 A1 * | 12/2015 | Toye | A45F 3/52 |
| | | | 47/31 |
| 2016/0120137 A1 * | 5/2016 | Toye | A01G 22/00 |
| | | | 47/31 |

FOREIGN PATENT DOCUMENTS

| | | |
|---|---|---|
| WO | WO 2014/041499 A1 | 3/2014 |
| WO | WO 2014/098621 A1 | 6/2014 |
| WO | WO 2014/182180 A1 | 11/2014 |

\* cited by examiner

*Primary Examiner* — Kristen C Hayes
(74) *Attorney, Agent, or Firm* — Seed IP Law Group LLP

(57) ABSTRACT

A woven sheet crop material comprising a woven region and a smaller knitted region. The woven region comprises a main body of the material and the knitted region is affixed to the woven region to provide an affixment region for attachment of fixing means, such as C clips or carbine clips.

26 Claims, 15 Drawing Sheets

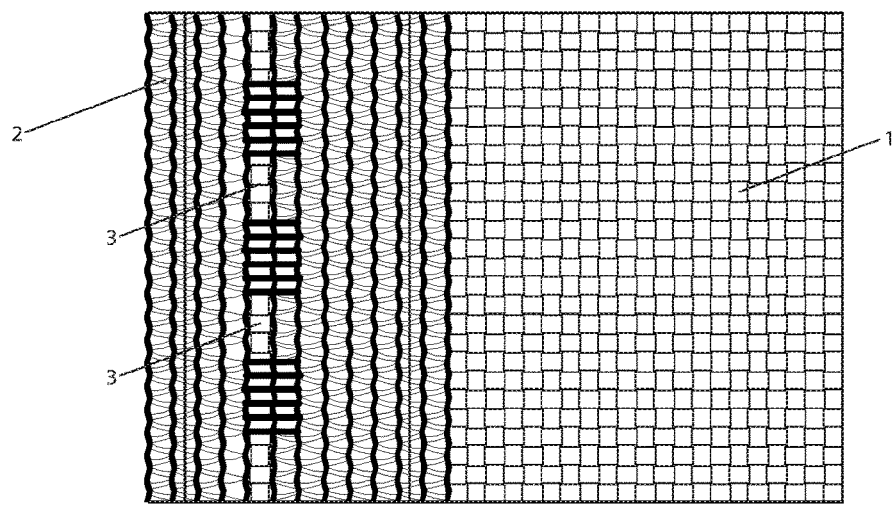
FIGURE 6A(i)
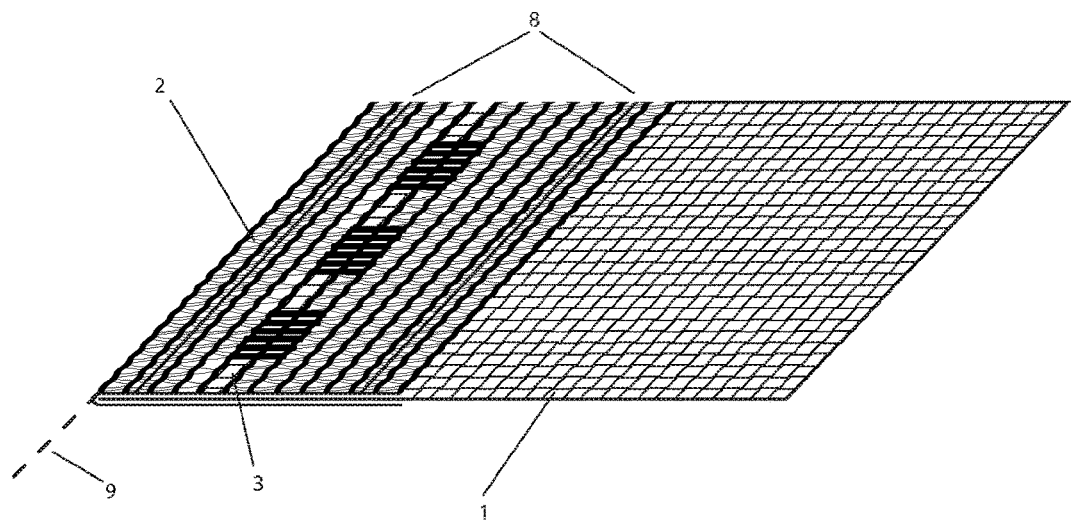
FIGURE 6A(ii)

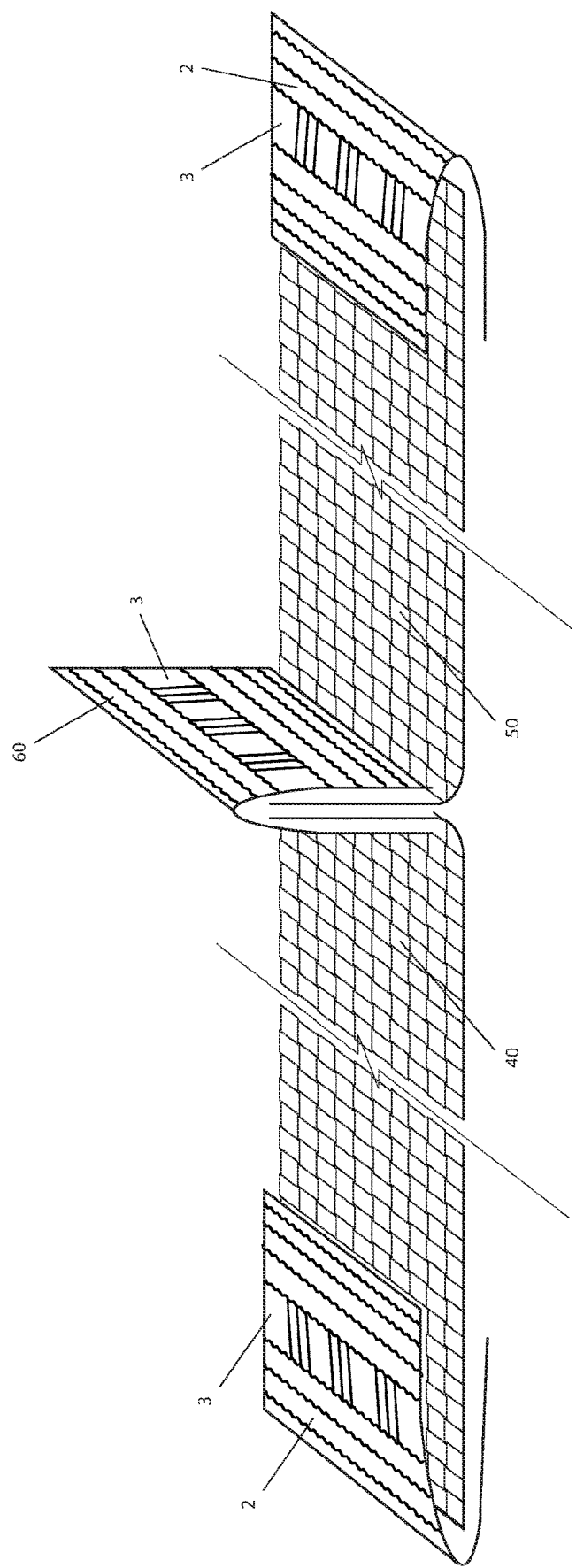

WOVEN SHEET CROP PROTECTION MATERIAL

FIELD OF THE INVENTION

This invention relates to agricultural materials, particularly but not exclusively to woven crop protection or crop production enhancement materials, such as those that protect against damage caused by wind, sun, hail, rain, birds or insects, or in other agricultural applications such as modify the plants environment.

RELATED APPLICATIONS

This application derives priority from New Zealand provisional application number 709671, filed 2 Jul. 2015, the contents of which are herein incorporated by reference.

BACKGROUND

Woven crop materials may be used in agriculture to shelter crops or animals from exposure to adverse environmental conditions, such as sun, wind or rain, or to provide protection from animals, such as birds or insects, that may damage a crop. They are also used as ground cover materials for weed control or to create more favourable environmental conditions for the growth and development of a plant or fruit on a plant. For example, a woven crop protection material may be used to increase reflected light.

In use, such woven materials are fixed and held in place, often by attaching a fixing means to a belt of woven material attached along the edge of the main body of material. Such belts are of higher tear resistance than the main body of the material and may include grommets. While such reinforced regions may be strong, they may also be heavy in weight and materials use, and even more so if grommets are used too.

An alternative example of a method of fixing and holding woven materials in place uses a length of wire which has been threaded along and inside the length of a hem on a lateral edge of the material. Such a method is labour intensive on installation; the wire needs to be placed in the fabric as it is being sown.

Crop protection materials may also be knitted materials. Knitted materials may be used for purposes similar to woven materials, although due to the apertures inherently present in a knitted structure (i.e. the holes in a knit pattern) they are more suited to use as, for example, wind break or wind screen materials, that have a lower coverage, than use as rain exclusion materials or materials that require a high coverage. Knitted crop protection materials may be provided with knitted eyelets, made during the knitting process, along their edge regions through which fixing means (such as wire clips) may be attached, so that the materials may be held in place. Alternatively, they may be provided without eyelets and in such cases fixing means (such as wire clips) may be passed through an edge region of the material itself. The knit structure at the edge of the material may be one of greater tear resistance, or greater tear resistance around any eyelets knitted into the material, to assist in maintaining the tear resistance of the edge region at the locations where fixing means are attached. As mentioned above, in general, knitted materials are not well suited for purposes such as rain exclusion because of the larger apertures inherently in a knit structure which allow the passage of rain. Knitted materials are also expensive to gain the high coverage possible from woven materials. For a similar reason, knit structures may not be suitable as shade materials that require a high degree of sun shading, as to gain a high coverage requires a high level of material which adds to the cost and weight of the material.

It is an object of the present invention to provide improved crop materials, or at least to provide the public with a useful choice.

SUMMARY OF THE INVENTION

Described herein is a crop material comprised of a woven main body region and a knitted region suitable for receiving a fixing means. The knitted region may be of sufficient tear resistance to be suitable for attachment to a hanging structure such as a wire or a vertical post, and may include eyelets to enable such hanging.

1. In a first aspect the present invention provides a woven sheet crop material comprising a woven region and a smaller knitted region, said woven region comprising a main body of the material, said knitted region affixed to said woven region and providing an affixment region for attachment of fixing means.
2. In some embodiments the woven sheet crop material is longer than it is wide and the knitted region extends lengthwise along the main body.
3. In some embodiments the woven sheet crop material has a length at least 10 or 20 times its width.
4. In some embodiments the knitted region has a width across the length of the crop material less than a width of the material.
5. In some embodiments the knitted region is folded along a length to form a double layer.
6. In some embodiments the knitted region is attached along an edge region of the main body of the material.
7. In some embodiments the edge region of the main body has been folded back upon itself to form a double layer, or more than double layer, of edge region of the main body and said knitted region is attached to said double layer, or more than double layer, of edge region of the main body.
8. In some embodiments the knitted region is attached along the main body intermediate between edges of the main body.
9. In some embodiments the knitted region is attached along the main body about centrally between edges of the main body.
10. In some embodiments the knitted region is folded around a part of said woven region.
11. In some embodiments the knitted region is folded around an edge part of said woven region.
12. In some embodiments the knitted region is folded around a part of said woven region intermediate between edges of the main body region.
13. In some embodiments the part of the woven region intermediate between edges of the main body region is a folded part of the main body region forming a flap along the main body of the material.
14. In some embodiments the knitted region is a single (i.e. not folded) layer of knitted material.
15. In some embodiments the knitted region is attached along an edge region of the main body of the material.
16. In some embodiments the knitted region is attached along a region of the main body intermediate between edges of the main body.
17. In some embodiments the knitted region is attached along the main body about centrally between edges of the main body.

18. In some embodiments the knitted region is attached along a portion of the main body that has been folded to form a flap.
19. In some embodiments the knitted region comprises a row of eyelets.
20. In some embodiments the knitted region comprises knitted material on opposite surfaces of the woven region, with eyelets in the knitted material on opposite surfaces of the woven region which align.
21. In some embodiments the knitted region has a width across the length of the material of between about 2 and 100 cm, 2 and 50 cm, 2 and 40 cm, 2 and 30 cm, 2 and 20 cm, 2 and 15 cm, or 2 and 10 cm, or between about 4 and 100 cm, 4 and 50 cm, 4 and 40 cm, 4 and 30 cm, 4 and 20 cm, 4 and 15 cm, or 4 and 10 cm.
22. In some embodiments the knitted region has a width across the length of the material less of than 30%, 20%, 10%, 8%, 6%, 5%, 4% or 3% of the width of the material.
23. In some embodiments the woven sheet crop material has a length longer than its width and a width of at least about 0.5 m, 1.0 m, 1.5 m, 2.0 m, 2.5 m, 3.0 m, 3.5 m, 4.0 m, 4.5 m, 5 m, 6 m, 7 m, 8 m, 9 m, 10 m, 12 m, 14 m, 16 m, 18 m, 20 m, 25 m, or 30 m.
24. In some embodiments the woven region is of a lighter weight, measured in grams per square meter, than said knitted region.
25. In some embodiments the woven region cannot withstand a point load force of more than about 10N, or more than about 50N, or more than about 100N, or more than about 150N, or more than about 200N, without suffering damage.
26. In some embodiments the knitted region can withstand a point load force of more than about 50N, or more than about 100N, or more than about 200N, or more than about 300N, or more than about 400N, or more than about 500N, without suffering damage.
27. In some embodiments the woven region comprises a woven affixment region having greater tear resistance than a main portion of the woven region, and wherein said knitted region is affixed to said woven affixment region.
28. In some embodiments the woven affixment region is a region that has been folded back on itself to form a double layer, or more than double layer.
29. In some embodiments the woven affixment region runs along or near at least part of the perimeter of the main body region.
30. In some embodiments the woven affixment region extends along the perimeter of at least part of the main body region, and has a width of between about 2 and 100 cm, 2 and 50 cm, 2 and 40 cm, 2 and 30 cm, 2 and 20 cm, or 2 and 10 cm.
31. In some embodiments the woven affixment region of the main body is a selvedge region.
32. In some embodiments the selvedge region is folded back upon itself to form a double layer to which the knitted region may be affixed.
33. In some embodiments the woven affixment region of the main body is a selvedge region of plain weave construction.
34. In some embodiments the knitted region is affixed to said affixment region by one or more lines of stitching running substantially parallel to an edge of the woven sheet crop material and said selvedge region is formed of elements that extend across the affixment region and tuck back beyond at least one or two of said lines of stitching.
35. In some embodiments the main body region is of leno weave construction.
36. In some embodiments the main body region is of plain weave construction.
37. In some embodiments the main body region has a weight of less than about 180 gsm, or less than about 160 gsm, or less than about 140 gsm, or less than about 120 gsm, or less than about 110 gsm, or less than about 105 gsm or less than about 85 gsm or less than about 65 gsm, or between 100 and 180 gsm, or between 130 and 160 gsm.
38. In some embodiments the knitted region has a pillar knitted construction.
39. In some embodiments the pillar knitted construction comprises pillars arranged longitudinally of the length of the knitted region, and eyelets are formed between adjacent pillars.
40. In some embodiments the knitted region has a weight of between about 25 and 500 gsm, or 50 and 400 gsm, or 80 and 300 gsm, or 100 and 200 gsm, or 140 to 180 gsm, or 300 to 420 gsm, or 300 to 380 gsm.
41. In some embodiments the weight per area of the knitted region is more than that of the woven region, or more than twice that of the woven region, or more than four times that of the woven region, or more than six times that of the woven region, or more than seven times that of the woven region.
42. In some embodiments the weight per area of the knitted region is between one and ten times that of the woven region, or between two and ten times that of the woven region, or between four and ten times that of the woven region, or between six and ten times that of the woven region.
43. In some embodiments the weight per area of the knitted region is less than that of the woven region, or less than about 75% of the woven region, or less than about 50% of the woven region, or less than about 25% of the woven region, or about 10% of the woven region.
44. In some embodiments the knitted region comprises between about 0.4% and 15%, or between about 0.7% and 12%, or between about 1% and 10% of the surface area of one side of the material.
45. In some embodiments either one or both of said main body and knitted regions are comprised of a synthetic polymer material.
46. In some embodiments the knitted region is comprised of low density polyethylene.
47. In some embodiments the knitted region is comprised of high density polyethylene.
48. In some embodiments the knitted region is affixed by stitching, heat welding, and/or chemical bonding.
49. In some embodiments main body of the material has a cover factor of 5 to 10%, or 10 to 30%, or 30 to 60%, or 60 to 85%, or 85 to 95%, or 95 to 100%, or 50 to 90%.
50. In some embodiments knitted region has a lengthwise extending edge that overlaps a lengthwise extending edge of the main body region (or edge of a fold in the main body region) by at least about 0.5 cm, or at least about 1 cm, or at least about 2 cm, or at least about 3 cm, or at least about 4 cm, or between about 0.5 and 30 cm, or between about 1 and 30 cm, or between about 2 and 30 cm.

51. In some embodiments the main body comprises two lengths of woven material joined along opposing edge regions, and said knitted region is fixed to, or forms part of the joining of, said opposing edge regions.
52. In some embodiments the woven sheet crop material has a length greater than its width, and said knitted region is an intermediate knitted region affixed along a lengthwise extending region of said main body intermediate between lengthwise extending edges of the material.
53. In some embodiments the woven sheet crop material also includes a further knitted region or regions affixed along a lengthwise extending edge or edges of the material.
54. In a second aspect the invention provides an installation of woven sheet crop material comprising a crop material of the first aspect of the invention having a length greater than its width and wherein said knitted region is affixed along a lengthwise extending region of said main body intermediate between lengthwise extending edges of the material, installed above or beside a row of crop plants, wherein the knitted region generally divides the main body into a first lengthwise extending main body region and a second lengthwise extending main body region, each lengthwise extending main body region lying generally in a plane that extends along the length of the row of plants, the plane of the first lengthwise extending main body region being at a different angle from horizontal than the plane of the second lengthwise extending region.
55. In some embodiments the material is arranged such that one lengthwise extending edge of the material is higher than the intermediate knitted region, and the knitted region is higher than the other lengthwise extending edge of the material.
56. In some embodiments the material is arranged such that the intermediate knitted region is higher than either of the lengthwise extending edges of the material.
57. In some embodiments the material also includes a knitted region or knitted regions affixed along a lengthwise extending edge or edges of the material.
58. In a third aspect the invention provides a crop material comprising a woven region and a knitted region, said woven region comprising a main body of the material, said knitted region affixed to said woven region and having greater tear resistance than said woven region, said knitted and woven regions affixed such that, when in use, said knitted region acts to distribute a force applied to a section of said knitted region more evenly across said woven region.
59. In a fourth aspect the invention provides a method of enhancing the growth or development of a plant, or fruit thereon, comprising installing and maintaining a woven sheet crop material as set forth above either above, beside, or beneath said plant such that said material influences the environmental conditions in which the plant is growing.

Advantages of the above invention include the provision of a woven crop material that may have regions of increased tear resistance at its edge regions, or in between the edges, and therefore less tendency to pull apart when a load is applied (e.g. load from wind pressure, weight of rain or hail, or from the weight of the material itself). The woven material of the invention may have a region for attaching fixing means that is lighter in weight compared to prior art materials, such as a woven fabric with grommets in a hem or with an added belt to which grommets are fastened to, which is beneficial in terms of cost of manufacture and cost of transport due to being lighter weight. The material of the invention may also be easier to fold than prior art materials, such as a woven fabric with grommets in a hem, due to the provision of a region for attaching fixing means that may be more flexible than regions for attaching fixing means of prior art materials. A further advantage may be the provision of a region for attaching a fixing means with more possible points of attachment than, for example, a woven fabric with an added belt including grommets for fastening. A still further advantage is that, in some embodiments, the invention may comprise knitted eyelets. Knitted eyelets offer alternative lower cost ways of fastening a woven material to a structure or wire or similar supporting device.

The term "cover factor" as used herein means the percentage of the total area of the material which comprises woven, or non-woven monofilament, yarn, or tape, or a combination thereof, forming the material itself, judged from perpendicular to the plane of the material when laid out flat, as opposed to air space in between the monofilaments/yarns/tapes from which the material is formed. Thus if a material has a cover factor of 30% then the air space through the material would be 70% of the total area of the material.

The term "elements" as used herein, or grammatical variations thereof, refers to the monofilaments, multifilaments, yarns, tapes or other material that makes up the weave or knit.

The term "crop protection" as used herein also includes crop production enhancement.

The term "tear resistance" as used herein with reference to a knitted or woven fabric means the resistance of the fabric to being torn. It also includes resistance of the fabric to being pulled apart or otherwise damaged by a force applied to pull against the material, and includes resistance of the fabric from having the uniformity of its knit or weave structure damaged, when under weight loading. It further includes resistance to bruising. The term "bruising" is a term that may be used to describe a woven fabric that has been damaged though disturbance of the uniformity of its weave structure.

The term "comprising" as used herein means "consisting at least in part of". When interpreting each statement in this specification that includes the term "comprising", features other than that or those prefaced by the term may also be present. Related terms such as "comprise" and "comprises" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

As used herein the term "and/or" means "and" or "or", or both.

As used herein "(s)" following a noun means the plural and/or singular forms of the noun.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The invention consists in the foregoing and also envisages constructions of which the following gives examples only.

BRIEF DESCRIPTION OF THE DRAWINGS

The invention is further described by way of example with reference to the accompanying drawings in which:

FIG. 6A(i) is a schematic illustration of a section of material of another embodiment of the invention, the main body of the material is of plain weave construction, the knitted region is folded around (not shown in this illustration) the edge of the woven region;

FIG. 6A(ii) a schematic illustration of the same embodiment as FIG. 6A(i), showing the material in a perspective view;

FIG. 7C is a schematic illustration showing a perspective view of a material showing two lengths of woven material joined with a folded knitted region to form a single length of material as illustrated in FIG. 7A, and also illustrating folded knitted regions attached at opposing lengthwise extending edges of the material;

DETAILED DESCRIPTION

Described above are crop materials and embodiments thereof having increased tear resistance at their load bearing points by the addition of knitted material. Particular embodiments of such a materials are now described in further detail. Two prior art materials are also described for the purpose of better illustrating the invention claimed herein.

Where specific integers are mentioned herein which have known equivalents in the art to which this invention relates, such known equivalents are deemed to be incorporated herein as if individually set forth.

Figure 1A:
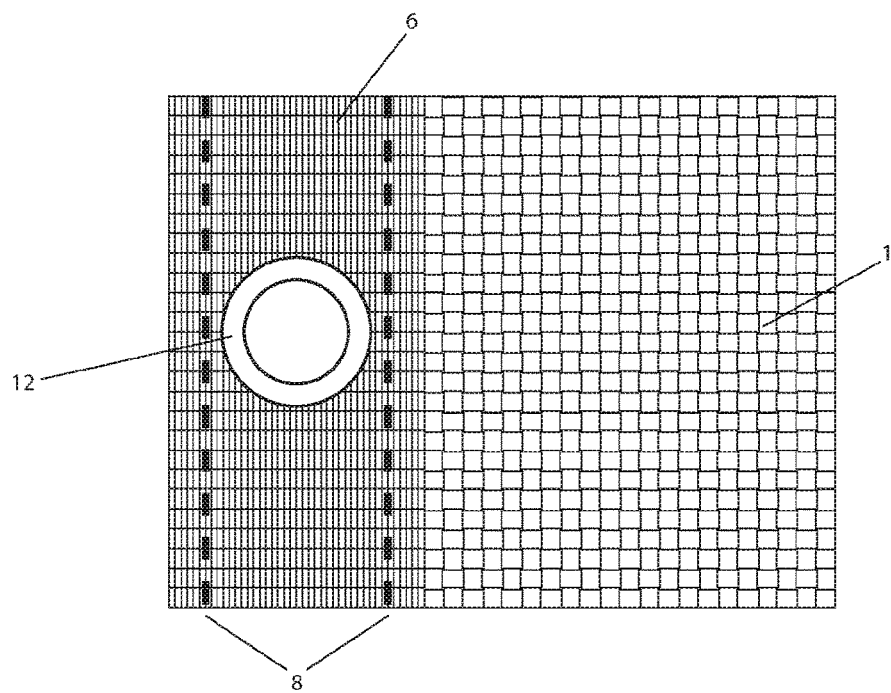
FIG. 1A is a schematic illustration of a prior art woven material employing grommets in a woven belt sewn onto the edge of the material.
Figure 1B:
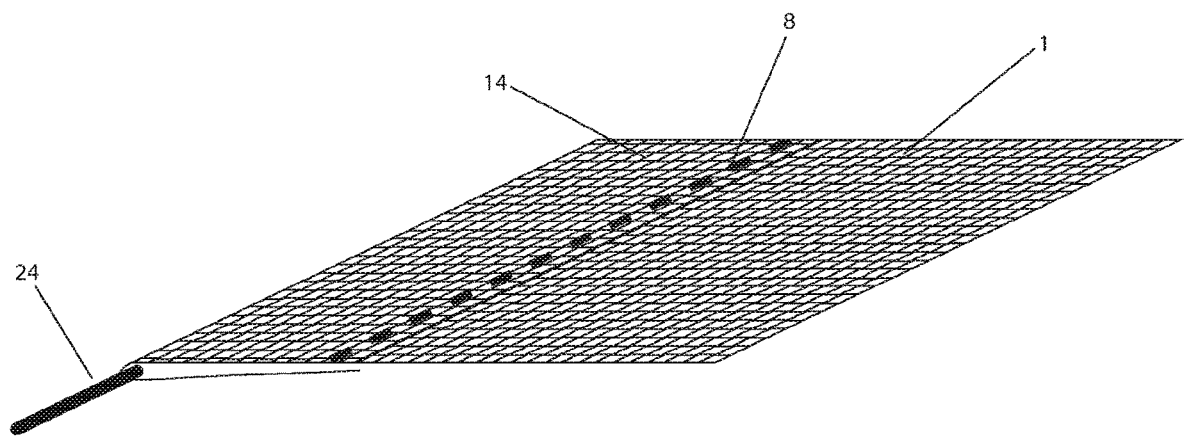
FIG. 1B is a schematic illustration of a prior art woven fabric employing a support wire threaded through a sewn hem.

FIG. 1A is a schematic illustration of a section of prior art material. The material comprises a woven main body 1 with a belt 6 of woven webbing attached along an edge of the material. The belt is stitched by lines of stitching 8 to secure it to the main body of the material. Metal or plastic grommets 12 are located along the belt at regular intervals. In use, fixing means may be attached through these grommets to suspend or fix the material in place. The belt 6 is comprised of a woven material having a higher tear resistance than the main body and therefore holds the grommet 12 securely in place when a load is applied to the material via a fixing means attached through the grommets. FIG. 1B is an illustration of a section of an alternative prior art material. The material comprises a main body 1. An edge of the main body has been doubled back on itself and stitched by a line of stitching 8 to form a hem 14. A length of wire 24 has been threaded through the inside of the hem. In use, the length of wire extends the full length of the hem with a section of wire extending outside either end of the hem. The ends of the wire may be fixed to a supporting structure, such as pole, to suspend the material in place.

Figure 2A:
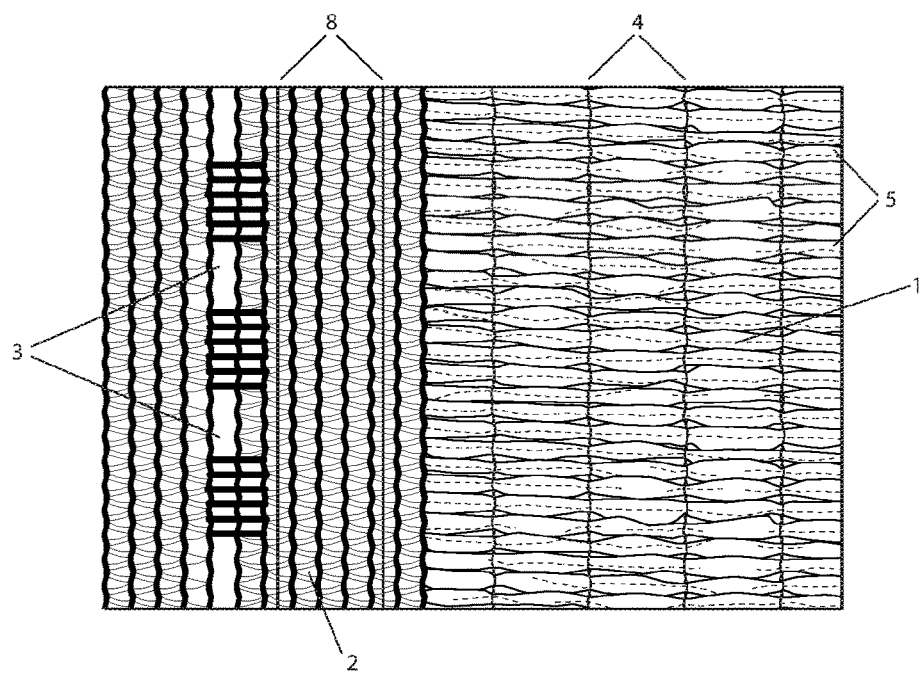
FIG. 2A is a schematic illustration of one embodiment of a material of the invention, showing one side of the material, the main body of the material is of leno weave construction, the knitted region is a single layer of knitted material stitched to the woven material without any folding.

FIG. 2A is a schematic illustration of a section of a crop material of one embodiment of the invention, in which the main body of the material is of leno weave construction, and the knitted region is a single layer (i.e. unfolded). As illustrated, the material has a length or strip of knitted material 2 which forms a knitted region, located at its lateral edge and affixed to a woven region which comprises the main body 1 of the material. The knitted region 2 comprises a row of integral holes defining eyelets 3 along its length, typically running parallel to the lateral edge of the material. A lateral edge of the knitted region extends beyond (i.e. overlaps with) a lateral edge of the woven material. The eyelets are suitable to receive a means for hanging the material such as a wire threaded through the material along the row of eyelets 3.

Main Body Region

The main body 1 of the material may be of any weave construction. In the embodiment illustrated in FIG. 2A the weave construction is a leno weave, although other weave constructions may be employed, including plain weave or basket weave. The weave construction may be of any type suitable for the intended crop protection purpose, for example wind, shade, hail, birds or insects. In the embodiment illustrated, the material is a windbreak or wind screen material, although it could also be used to provide shade in some circumstances. As mentioned above, the weave is of leno weave construction. It uses tapes 5 in the weft direction and yarns or filaments 4 (such as monofilaments) in the warp direction. A leno weave construction may use a relatively low number of warp yarns thereby assisting in the provision of a light weight construction. In a leno weave the weft tapes may be locked in place by crossing two or more warp threads over each other at intersections between weft tapes (compared to normal weaving which has no twisting of the warp yarn around the weft yarn).

The warp yarns 4 and weft tapes 5 may be formed from any suitable material, including plastic or polymer materials. Typically, they are extruded from a polymer resin. In particular they may be comprised of thermoplastic polyolefins such as polyethylene or polypropylene, for example, or a mixture thereof, or an ethylene alpha-olefin, or a polyester, or a biopolymer, or a blend of any of the foregoing. Certain plastics are particularly useful when present as minor or major components. Ethylene vinyl acetate (EVA), ethylene butyl acrylate (EBA), thermoplastic polyurethane (TPU), ethylene methyl acrylate (EMA) and elastomers are useful for imparting elasticity and other properties. Polyamides, such as nylon, can be used to add strength. Polyesters, polyethylene terephthalate (PET), polymethylmethacrylate (PMMA) and polycarbonate may also be useful. Starch and other plant polymers are useful to increase biodegradability. The polymer or polymer blend may incorporate agents such as one or more pigments, UV stabilisers, or processing aids.

In the embodiment of FIG. 2A, the weft tapes 5 are comprised of polyethylene and pigment in the form of tapes 2.6 mm wide and 60 microns thick, approximately 1100 denier. The weft tapes are slightly folded by the leno-weave structure. More particularly, the distance between crossovers of the leno woven warp yarns is slightly less than the width of the weft tapes, such that the weft tapes are slightly folded. The dual warp yarns are about 16 mm apart or at about 1.5 dual insertions per inch. The folding of the weft tapes is illustrated by the dotted horizontal lines drawn thereon. The warp yarns 4 are comprised of polyethylene in the form of filaments of about 290 microns diameter, approximately 500 denier. The cover factor of the main body of the material is 70 to 85%. However, any construction of weave and form of warp and weft tapes that is suitable for providing crop protection may be employed.

The weight of the woven material of the main body in the embodiment illustrated in FIG. 2A is about 65 gsm. To achieve the same coverage with a main body of knitted construction would require a material having a weight of approximately 260 to 360 gsm. In other embodiments the weight of the woven material may be 30-180 gsm.

The material of the invention may comprise a woven main body that has relatively low tear resistance. For example, in some embodiments the main body may not be able to withstand point loads forces of more than 10N (N being newton), or more than 50N, or more than 100N, or more than 150N, or more than 200N, without damaging the material. The term "point load force" as used herein means a force applied to pull against the material, with an attachment point being applied at a small section of the material. For example, the attachment point may be a ring clip comprising 3 mm diameter spring steel passed through the material. Point load as discussed herein can be measured using a tensile tester set to a speed of 100 mm/minute.

Figure 2B:
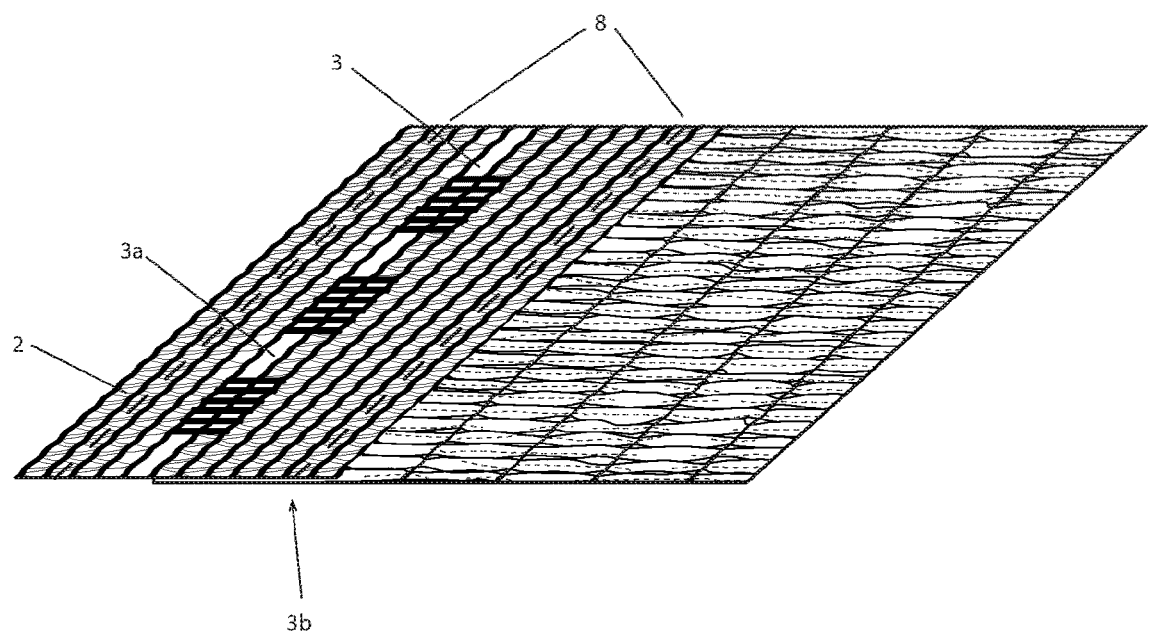
FIG. 2B is a schematic perspective view of the embodiment of FIG. 2A in cross section.

FIG. 2B is a cross-sectional perspective view of the embodiment of FIG. 2A. The cross section part of this illustration shows the knitted region partially overlaying an edge region of the main body of the material.

Figure 2C:
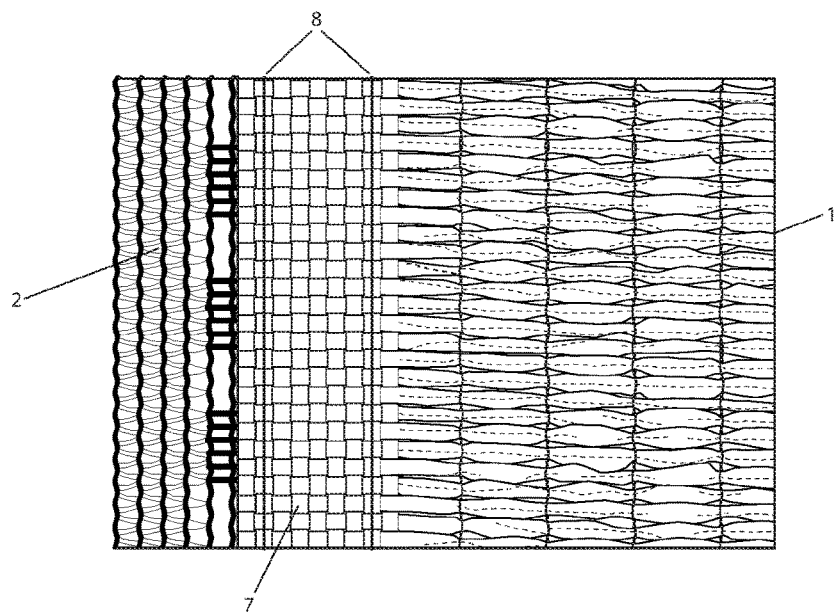
FIG. 2C is a schematic illustration of the same embodiment as FIG. 2A, showing the other side of the material.

FIG. 2C is an illustration of the same embodiment as shown in FIG. 2A, but showing the other side of the material. As illustrated, the woven main body of the material has an affixment region being an edge region 7 in the form of a plain weave region. The edge region may comprise a tuck-in selvedge. The ends of the weft tapes forming the selvedge may be folded to the opposite side of the material (i.e. the side opposite to that illustrated in FIG. 2C) and do not show in the illustration. The ends of the weft tapes forming the selvedge may extend across the entire affixment region (e.g. the ends of the weft tapes forming the selvedge may extend across the affixment region such that they form part of the support for all lines of stitching that attaches knitted material to the woven material), or only part of it. In the plain weave region the warp yarns may be tapes having the same characteristics as the weft tapes. The plain weave region may provide a region at the edge of the woven region that has higher tear resistance than the main body of the material, and may provide a substrate of stronger integrity to which the knitted region may be attached, as discussed further below. This is a particularly beneficial arrangement as it may allow the material to have high cover factor and light weight in the main region of the main body (i.e. woven region) of the material, and have a region of higher tear resistance at the edge of the main body. This edge region provides a zone in the main body of the material to which the knitted region may be securely affixed. Some embodiments do not employ a region of higher tear resistance (such as a selvedge region) at the edge, and in such embodiments the knitted region is fixed directly onto material that is the same as that of the main region of the main body.

Alternatively, the affixment region of the main body of the material may be of other constructions of weave, provided such constructions are of higher tear resistance than the main body region. The type of weave construction itself may be varied, or alternatively the tapes or monofilaments making up the weave may be altered to be thicker, spaced more closely, or of different width or made of stronger material.

The affixment region of the main body of the material may also be located other than along an edge of the main body of the material, for example a plain weave section could be woven to constitute a central lengthwise extending region of an otherwise leno weave material, and a knitted region could be affixed thereto.

Figure 2D:
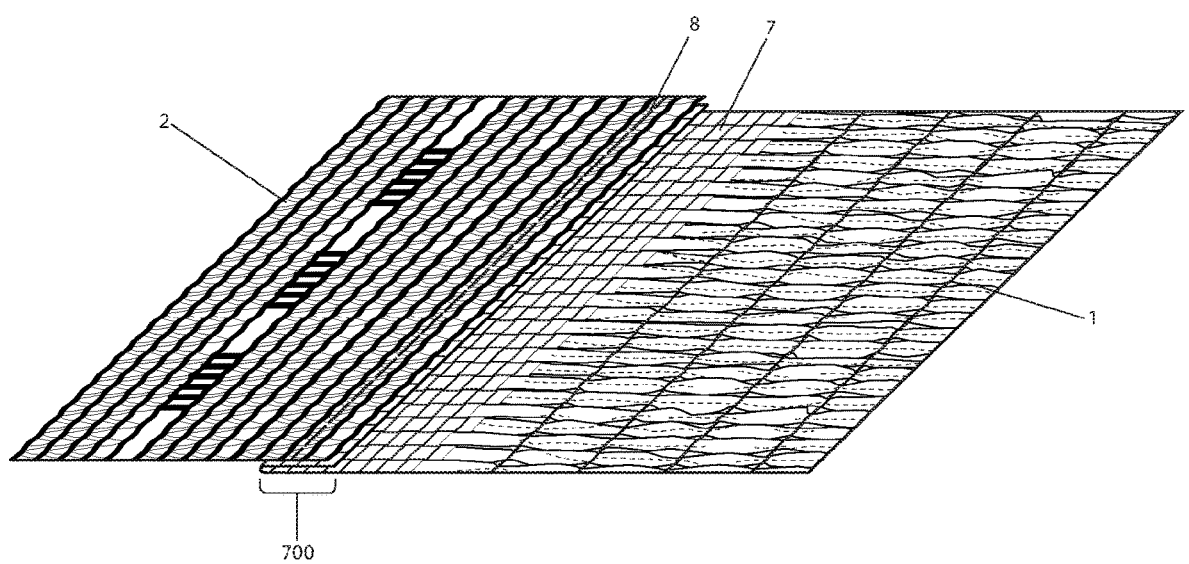
FIG. 2D is a schematic perspective illustration of an embodiment similar to that of FIG. 2A but which includes an affixment region which has been doubled back on itself to provide a double layer of main body material to which a knitted region has been attached.

FIG. 2D is a cross-sectional perspective schematic illustration of an embodiment similar to that of FIGS. 2A to 2C but which includes a plain weave edge region 7 which has been doubled back on itself 700 to provide a double layer of main body material (in a manner similar to a hem). This provides an affixment region of the main body of the material to which a knitted region 2 is attached. Put another way, an edge region of the main body of the material has been folded along a fold line that extends generally parallel to the edge of the main body of the material, and is proximate to that edge. The illustration has been shown in a slightly 'exploded' format for the purposes of better illustration. The knitted region 2 is secured to the double layer of the main body of the material (which forms the affixment region of the main body) by a line of stitching 8 that extends along the length of the double layer region 700, and stitches the double layer of the folded edge region of the main body and the knitted region 2 together. Optionally, more than one line of stitching may be used. In other embodiments, the edge region of the main body of the material is of the same or similar construction to the main body of the material and it is folded back on itself to form a double layer edge region to which a knitted region may be affixed. It will also be appreciated that an edge region, or other region, of the main body of the material could be folded to form a triple or more layer to which a knitted region may be affixed.

For the purposes of simple illustration, the lines of stitching 8 in the attached figures have been illustrated as running stitch. However, it will be appreciated that any one (or more) of a variety of known stitches may be used. In some embodiments the stitch type is a type that will not unravel, or is resistant to unravelling, if cut or broken.

Figure 3:
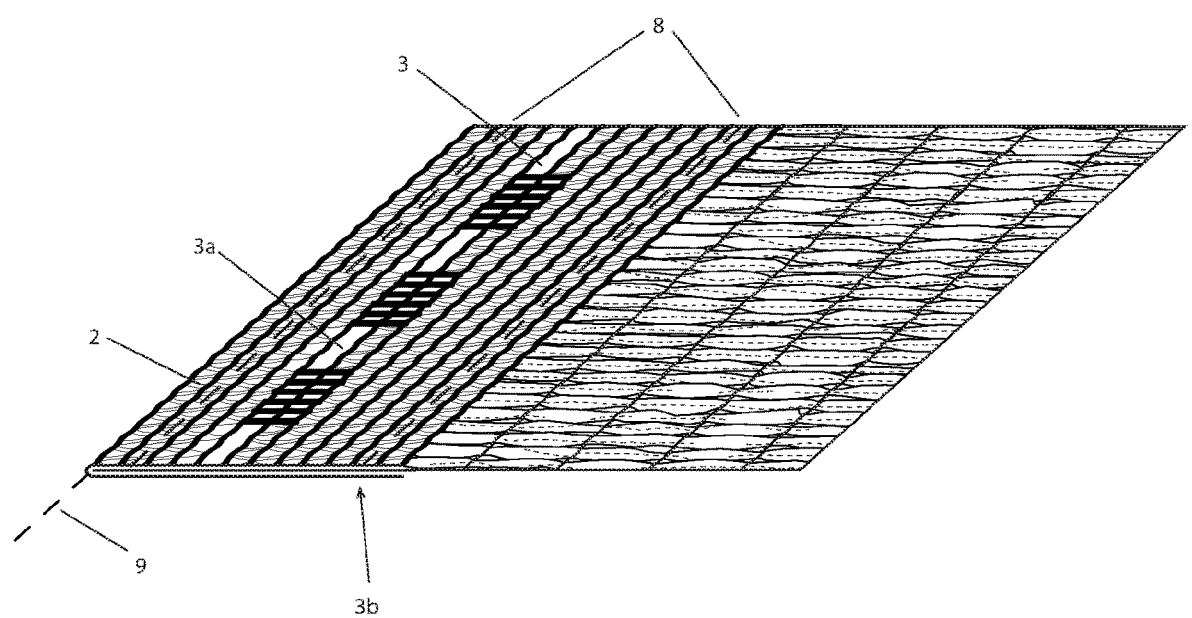
FIG. 3 is a schematic illustration of another embodiment of the invention, similar to that of FIG. 2A except in that the knitted region is folded around the edge of the woven region to form a double layer of knitted material.

FIG. 3 is a schematic illustration of another embodiment of the invention, similar to that of FIGS. 2A to 2C except in that the knitted region 2 is folded at a lengthwise extending fold line 9 and around the edge of the woven region. In FIG. 3, the knitted region mirrors itself along the lengthwise extending fold line 9 such that, when folded, rows of knitted eyelets 3 on either side of the fold line 9 align. The main body 1 of the material in the embodiment illustrated in FIG. 3 is the same as that illustrated in FIG. 2A. The main body 1 of the material may be located to either abut against or close to the fold in the knitted region as shown. To attach a fixing means (such as a C clip or a carbine clip) to the material, the fixing means is passed through an eyelet 3a on one side of the material, pierces though the main body of the material (the main body of the material is visible through the eyelets in the illustrated embodiment, but for clarity of illustration it is not shown in FIG. 3), and then passes through an aligned eyelet 3b on the opposite side of the material. In other embodiments, the edge of the main body may be set back from the fold in the knitted region, such that it does not obstruct any eyelets in the knitted region when the knitted region is folded around the edge of the main body.

Figure 4A:
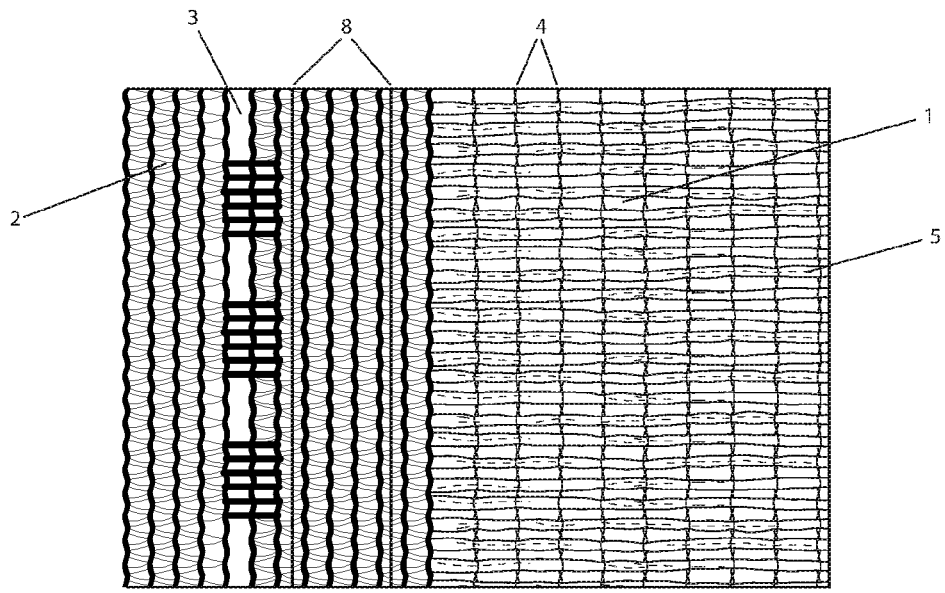
FIG. 4A is a schematic illustration of another embodiment of a material of the invention, showing one side of the material, the main body of the material is of leno weave construction, the knitted region is a single layer of knitted material stitched to the woven material without any folding.

FIG. 4A illustrates an alternative embodiment of the invention, showing one side of the material, in which the knitted region is a single layer (i.e. unfolded). The main region of the main body 1 of the material of FIG. 4A is of leno-weave construction and has relatively lower cover factor compared to the material of FIG. 2A. The warp elements 4 in the main body region are of about 500 denier and inserted at a rate of about 3.2 dual insertions per inch. The dual warp elements are 8 mm apart. The weft tapes 5 are of about 1600 denier, having a width of about 3 mm, and an insertion rate of about 7.2 tapes per inch. The weight of the main region of the main body of the material is approximately 75 gsm. The cover factor of the main region of the main body is approximately 50%. The cover factor is lower here than in FIG. 3, due to less spacing along the width of the main body of the material between pairs of warp yarns. The smaller spacing means that the segments of the weft tapes located between adjacent pairs of warps yarns are not able to unfold, resulting in the lower cover factor.

Figure 4B:
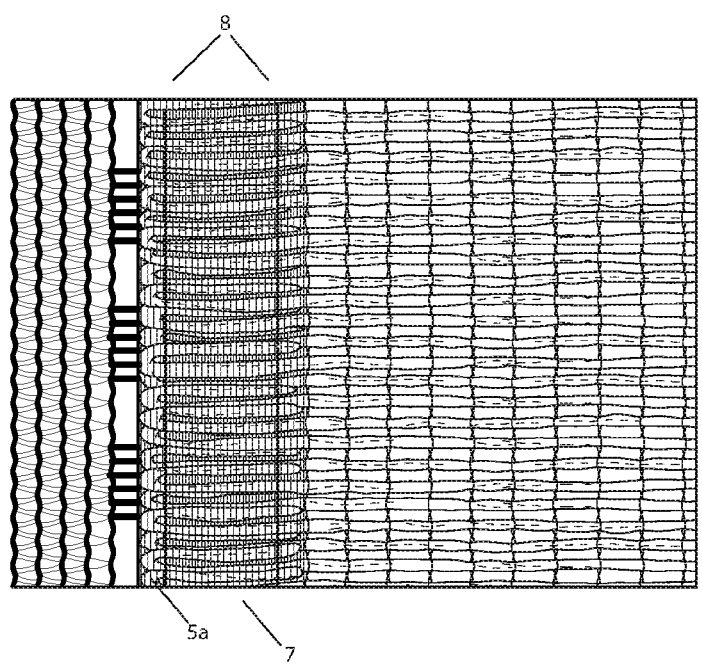
FIG. 4B is a schematic illustration of the same embodiment as FIG. 4A, showing the other side of the material.

FIG. 4B illustrates the opposite side of the material shown in FIG. 4A. As illustrated by FIG. 4B, the main body has a plain weave selvedge 7 formed of the same monofilaments in the warp as the main region of the main body. The weft tapes in the selvedge are the ends of the weft tapes of the main region of the main body, and are tucked back into the weave structure to form the selvedge. The selvedge region forms an affixment region of the main body, providing a region of the main body of higher tear resistance which may be more suitable for affixing the knitted region 2. The tucked back ends of the weft tapes may be of length sufficient to extend across the affixment region such that they extend beyond one or two (or more) lines of stitching attaching the knitted region to the main body of the material, as illustrated. The warp elements 5a in the affixment region have a higher insertion rate than those of the main region of the main body of the material. This assists in maintaining the tear resistance of the affixment region. In the embodiment illustrated by FIG. 4B, the insertion rate of the affixment region is 51 monofilaments per inch.

The knitted region of the embodiment illustrated in FIG. 4A is the same as that of FIG. 2A, and is further described later. The knitted region is stitched to the affixment region by two rows of stitching 8 extending along the length of the knitted region.

Figure 5:
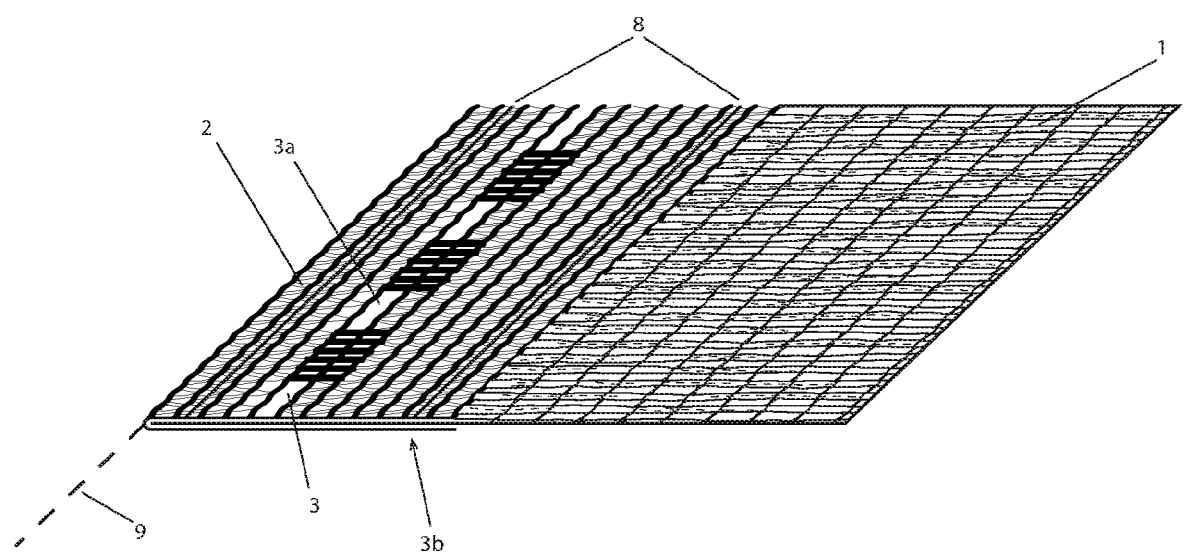
FIG. 5 is a schematic illustration of another embodiment of the invention, similar to that of FIG. 4A except in that the knitted region is folded around the edge of the woven region to form a double layer of knitted material.

FIG. 5 is a schematic illustration of another embodiment of the invention, similar to that of FIGS. 4A and 4B except in that the knitted region 2 is folded at a lengthwise extending fold line 9 and around the edge of the woven region which forms the main body 1. The main body 1 is the same as that illustrated in FIG. 4A. The main body 1 of the material is located either to abut against or close to the fold 9. In the same manner as described above with reference to FIG. 3, to attach a fixing means (such as a C clip or a carbine clip) to the material, the fixing means is passed through an eyelet 3a on one side of the material, pierces though the main body of the material (again, the main body of the material is visible through the eyelets in this embodiment, but for clarity of illustration it is not shown in FIG. 5), and then passes through an aligned eyelet 3b on the opposite side of the material.

FIG. 6A(i) illustrates a further alternative embodiment of the invention. In the embodiment of FIG. 6A(i), the main body of the material is of a plain weave construction. The warp and weft tapes are the same in dimension and make up, each being about 2.4 mm wide, approximately 1040 denier, and about 0.5 mm thick. The weave has an insertion rate of about 10.4 tapes per inch for both warp and weft tapes. The weight of the material is about 135 gsm. The material may be coated on one or both sides. The cover factor of the main body of material is 95 to 100%. The tapes are comprised of polyethylene, non-pigmented. The edges are cut with a hot knife, heat sealed or ultrasonically sealed.

The main body regions of the embodiments of the invention described above may be woven on a circular loom. Fabrics woven on a flat loom may also be used.

In some embodiments the edge (or edges) of the main body of the material has a tuck in or selvedge. In some embodiments the edge (or edges) of the main body of the material are cut with a hot knife, heat sealed, or ultrasonically sealed. In some embodiments the edge (or edges) of the main body of the material are simply cut.

In some embodiments the main body of the material is coated with a thin layer of plastic material to seal the woven fabric. In some embodiments the main body of the material is uncoated.

In some embodiments the main body of the material is substantially water impermeable.

In some embodiments, at least the main body of the material may comprise pigment to influence its solar radiation reflection, absorption or transmittance properties, which may be particularly desirable in horticultural applications. In some embodiments the main body of the material may:

absorb more than about 20%, or more than about 40%, or more than about about 50%, or more than about 60%, or more than about 70%, on average, of solar radiation across the wavelength range 280 to 400 nm; and transmit more than about 30%, or more than about 50%, or more than about 70%, or more than about 80%, or more than about 90%, on average, of solar radiation across the wavelength range 400 to 700 nm; and either reflect more than about 40% or more than about 50%, on average, of solar radiation across the wavelength range 700 to 2500 nm; or absorb more than about 30% or more than about 40%, on average, of solar radiation across wavelength range 700 to 2500 nm.

Such a material may be useful for horticultural applications requiring high UV protection while allowing some visible and infra-red light through, and for rain or hail exclusion, or for wind protection.

In some embodiments at least the main body of the material may:

absorb more than about 50%, or more than about 70%, or more than about 90% of solar radiation across wavelength range 280 to 2500 nm.

Such a material may be useful for horticultural applications requiring shading from the sun.

In some embodiments at least the main body of the material may:

absorb more than about 40%, or more than about 50%, or more than about 60%, or more than about 70%, on average, of solar radiation across the wavelength range 280 to 400 nm; and reflect more than about 40%, or more than about 50%, or more than about 60%, or more than about 70%, on average, of solar radiation across the wavelength range 400 to 700 nm; and either reflect more than 30% or more than about 50%, or more than about 70%, on average, of solar radiation across the wavelength range 700 to 2500 nm; or absorb more than about 15%, or more than about 30%, or more than about 50%, on average, of solar radiation across wavelength range 700 to 2500 nm Such a material may be useful for horticultural applications requiring high UV absorbency and high visible light reflection.

In some embodiments at least the main body of the material may:

absorb more than about 50%, or more than about 70%, or more than about 90% of solar radiation across wavelength range 280 to 400 nm; and transmit more than about 50%, or more than about 60% of solar radiation across the wavelength range 400-2500 nm.

Such a material may be useful for horticultural applications requiring high UV absorbency and high visible light transmission. Such material is also useful as insect, hail, rain, and wind protection.

In some embodiments at least the main body of the material may:

reflect more than about 40%, or more than about 60%, or more than about 80% of solar radiation across wavelength range 280 to 2500 nm.

Such a material may be useful for horticultural applications requiring shading from the sun.

In some embodiments at least the main body of the material may:

transmit more than about 50%, or more than about 60% or more than about 70% of solar radiation across the wavelength range 280 to 2500 nm; and reflect more than about 10%, or more than about 15% or more than about 20% of solar radiation across the wavelength range 280 to 2500 nm.

Such a material may be useful for horticultural applications requiring rain exclusion and high visible light transmission.

The main body of the material may have a cover factor of 5 to 10%, or 10 to 30%, or 30 to 60%, or 60 to 85%, or 85 to 95%, or 95 to 100%.

The main body of the material (i.e. excluding any edge regions of heavier construction) may have weight of less than about 180 gsm, or less than about 160 gsm, or less than about 120 gsm, or less than about 105 gsm or less than about 85 gsm or less than about 65 gsm.

In some embodiments, the main body of the material may be woven from elements, such as tapes, having a denier of between 250 and 3500, or between 500 and 1300, or between 800 and 1300, or between 1000 and 1400, or about 1100, or between 1400 and 2000, or between 2000 and 3000, or about 2500.

In some embodiments the crop material has a length greater than its width. In some embodiments the width is at least 0.5 m, 1.0 m, 1.5 m, 2.0 m, 2.5 m, 3.0 m, 3.5 m, 4.0 m, 4.5 m, 5 m, 6 m, 7 m, 8 m, 9 m, 10 m, 12 m, 14 m, 16 m, 18 m, 20 m, 25 m, or 30 m, and its length is at least 10, 20, 30, 40, 50, 75, 100, 125, 150, 175, 200, 250, 300, 400 or 600 times its width.

In some embodiments the crop material has a width greater than its length.

In some embodiments the width of the crop material is between 0.5 and 30 m, or 1.0 and 30 m, or 1.5 m and 30 m, or 2.0 m and 30 m, or 4.0 and 30 m.

In some embodiments the crop material's length is at least 10, 20, 30, 40, 50, 75, 100, 125, 150, 175, 200, 250, 300, 400 or 600 times its width.

The main body of the material may have two long sides which are generally parallel to each other. The ends of such material may be square such that the main body of the material is rectangular, or generally rectangular, or they may be cut at an angle or otherwise shaped suitable for the purpose of providing protection or attachment of fixing means once installed in the environment in which they will be deployed. The crop material (i.e. including knitted region) may have the same shape.

Knitted Region

The knitted region may employ any one (or more than one) of a large variety of knit patterns, as long as the knit pattern used has sufficient tear resistance to hold together under load conditions. The knitted region may have a much higher degree of structural integrity (e.g. resistance to being pulled or torn apart when under weight loading) than woven fabrics of similar grams per square meter, i.e. more strength per gram than a woven type construction, and may avoid the need for grommets, which are more expensive in terms of materials used, plus cost to attach to the material and also are heavier in weight.

The material of the invention may comprise a knitted region that is of relatively high tear resistance. For example, in some embodiments the knitted region may be able to withstand point loads forces (as previously defined) of more than 50N, or more than 100N, or more than 200N, or more than 300N, or more than 400N, or more than 500N, without damaging the material.

The lighter weight and/or the lack of grommets also means that the material may fold better than materials having reinforced edge regions of woven material. A better fold means that the material is easier to prepare for storage and/or transportation, and uses less space in storage and transportation. This is important both for the manufacture and shipping of the material, as well as for use by a grower, in particular when the grower requires storage of the material between periods of use.

In use, some prior art woven crop materials are suspended from overhead horizontal wires via fixing means, such as C clips or carbine clips, which are attached along, for example, opposing lengthwise edges of the material. The fixing means are typically attached to the material through grommets. The fixing means pass though the grommets at a plurality of locations along the materials edge and around horizontal wire such that the material is located in place above the crop. Alternatively, rather than using a fixing means such as C clips, the wires may be threaded through, for example, grommets located in hems of opposing edges of the material. In some situations, it is desirable to slide the material along the wire, such that it may reside in a retracted position where it does not cover plants, or an extended position where it does cover plants. It may also be desirable to slide the material along a wire during installation or removal of the material. The aforementioned prior art arrangements are often not well suited to sliding of the material in such a manner, due to low flexibility of the hem. A woven material with a knitted region, as described herein, may be more suitable to attachment to and sliding along an overhead wire. This may be the case for installations where fixing means such as C clips are used to attach the material to a wire, or for installations where a wire is threaded directly though the material (or though eyelets in the material) itself.

A further advantage is that fixing means may be passed directly through the knitted material without doing significant damage to its general structure, meaning that the places for attaching fixing means can be anywhere along the length of the material, rather than at discrete intervals as is with grommets. This may be advantageous in installation of materials due to the flexibility of options in choosing where a fixing means may be attached. A similar benefit can be achieved with eyelets in the knitting, whereby due to the lower weight of knitting forming an eyelet compared to a grommet, many more eyelets can be placed along the length of the material giving many points for attachment of the fixing means. The increase in points of attachment may also provide the advantage that the load can be spread over more attachment points. The increase in points of attachment also enables a high density of attachment points to be localised in an areas along the length of the material in need of such additional attachment points.

Any one (or more) of a variety of knit constructions may be employed in the invention, as long as they are of sufficient tear resistance to hold together when under weight from loading (for example from the material of the invention itself when in use when hung from a wire, or due to loading resulting from adverse weather).

The knitted regions (2) of the illustrated embodiments are formed in a pillar knit construction, although as mentioned above other constructions of knit may be used. The term "pillar knit" as used herein means a construction comprising pillars (typically extending in the warp direction) of knotted yarn held in generally parallel arrangement by yarn or yarns that cross back and forth (i.e. crossover yarns) between each pillar of knotted yarn and a pillar of knotted yarn adjacent that pillar. The adjacent pillar may be immediately adjacent, or the crossover yarn may extend back and forth across over one or more adjacent pillars. A pillar may be formed from one or more pillar yarns in the form of a chain stitch, and with the crossover yarns looped or knotted though the pillar to form a fabric, or a pillar may be formed by crossover yarns themselves (i.e. no pillar yarn) being knotted such that they form a column of closely arranged knots. In the construction shown the knit comprises pillars, each of which has three yarns, one yarn that crosses back and forth along the length of the knitted region between the pillar and two adjacent pillars located on one side of the pillar, another yarn that crosses back and forth along the length of the knitted region between the pillar and the two adjacent pillars located on the other side of the pillar, and a pillar yarn that is knitted together with the other two crossing yarns to form the pillar along the length of the netting material.

The yarns (e.g. monofilaments, multifilaments or tapes) making up the knitted region may be formed from any suitable material, including plastic or polymer materials. They may be formed from any of the materials already described above as materials from which warp and weft tapes of the main body may be made. In some embodiments, the knitted region may be formed of low density polyethylene (LDPE). Such a material has the advantage of high flexibility, and flexibility may be advantageous when folding the material. In other embodiments the knitted region may be formed from high density polyethylene (HDPE). This may be advantageous when less stretch or additional strength is required.

The knitted region may comprise a knitted material having a length longer than its width, and a width of between 2 and 100 cm, 2 and 50 cm, 2 and 40 cm, 2 and 30 cm, 2 and 20 cm, 2 and 15 cm, or 2 and 10 cm. The term "width" as used herein with reference to the knitted regions that have been folded refers to the width of the knitted region in the folded state, unless the context requires otherwise.

In some embodiments the knitted region has a weight of between 25 and 500 gsm, or 50 and 400 gsm, or 80 and 300 gsm, or 100 and 200 gsm, or 140 to 180 gsm. In other embodiments the knitted region has a weight of 20 to 240 gsm, 30 to 120 gsm, or 40 to 100 gsm, or 40 to 80 gsm. In embodiments (described later) where the knitted region is folded, the weight may be double the aforementioned figures.

In some embodiments, the knitted region may be comprised of yarns having a denier of between 100 and 1000, or between 200 and 800, or between 400 and 600, or about 500, or about 250.

In some embodiments the weight per area of fabric (e.g. gsm) of the knitted region is more than that of the main body, or more than twice that of the main body, or more than four times that of the main body, or more than six times that of the main body, or more than seven times that of the main body.

In some embodiments the weight per area of fabric (e.g. gsm) of the knitted region is between one and ten times that of the main body, or between two and ten times that of the main body, or between four and times that of the main body, or between six and ten times that of the main body.

In some embodiments the weight per area of fabric (e.g. gsm) of the knitted region is less than that of the main body, or less than 75%, or less than 50%, or less than 25%, or about 10% of that of the main body.

In some embodiments, the knitted region covers between 0.4% and 15%, or between 0.7% and 12%, or between 1% and 10% of the surface area of one side of the material.

Knitted Region—Single Layer

With reference to FIG. 2C, as illustrated the knitted region may be fixed to the plain weave or affixment region by stitching two lines of stitching 8 to provide a secure attachment which spreads load applied to sections of the knitted region across a broader area of the main body region. The lines of stitching run along the length of the knitted region parallel to the edge of the main body region. The knitted region is a single layer (i.e. is not folded, as in other embodiments described herein). The term "single layer" is used herein to distinguish a knitted region provided on one side of the main body edge (i.e. single layer) from one folded (i.e. double layer) around an edge of the main body. However, the skilled reader will appreciate that a "single layer" of knitted material on one side of the main body edge could itself be formed of multiple layers of knitted material.

Other embodiments may use less or more lines of stitching. In alternative embodiments the knitted region may be fixed to the affixment region of the main body region in other ways, such as heat welding or chemical bonding or by interlacing threads of the knitted region into the woven region or vice versa. In embodiments where the main body does not comprise an affixment region of different construction to the rest of the main body, the knitted region is attached directly to the main body by any of the means already discussed above.

In some embodiments, an edge of the main body of the material may be folded back on itself to provide a double layer section of material extending along an edge of the material, in a manner similar to a hem. Such a folding back of material upon itself is an alternative way provide a region to which knitted material may be attached securely, for example sewn with one or more lines of stitching. Such an arrangement may provide more material for stitching to grip to, thereby substantially increasing seam strength (for example in one trial material by the applicant seam strength increased from 18 kgf to 32 kgf by such folding). The material may be folded in such a manner along a fold line extending substantially parallel to an edge of the material and located more than 2, or 4, or 6, or 8, or 10, or 15, or 20, or 40, or 50 mm from the edge of the material. Such a fold line may be between 2 and 100 mm, or 4 and 100 mm from the edge, or between 2 and 50 mm or 4 and 50 mm from the edge.

When the main body of the crop material is folded for the purpose of affixing a knitted region and the knitted region is attached thereto by a line of stitching, the stitching may extend in a direction along the length of the folded region. The stitching may extend in a direction along the length of the folded region immediately to the side of a fold line of the folded region, or it may extend along the edge of the folded section most distal from a fold line, or anywhere in between.

The knitted region has been described above as being fixed to the perimeter of the main body region. The knitted region may be attached along the entire length of a lengthwise extending edge, or along the entire width of a widthwise extending edge, or both. Alternatively, it may be attached at intervals along such edges such that the material has discrete sections of knitted regions extending along its length or width.

In alternative embodiments, the knitted region may be affixed to the main body at a region other than the perimeter, such as a region near (closer to the edge than the center) or running parallel to the perimeter of the main body, or such as a region running down the centre or near to the centre, or off to one side of the centre, of the length of rectangular shaped or oblong material to provide a suspension point (line) running down the length of the material.

Figure 2E:
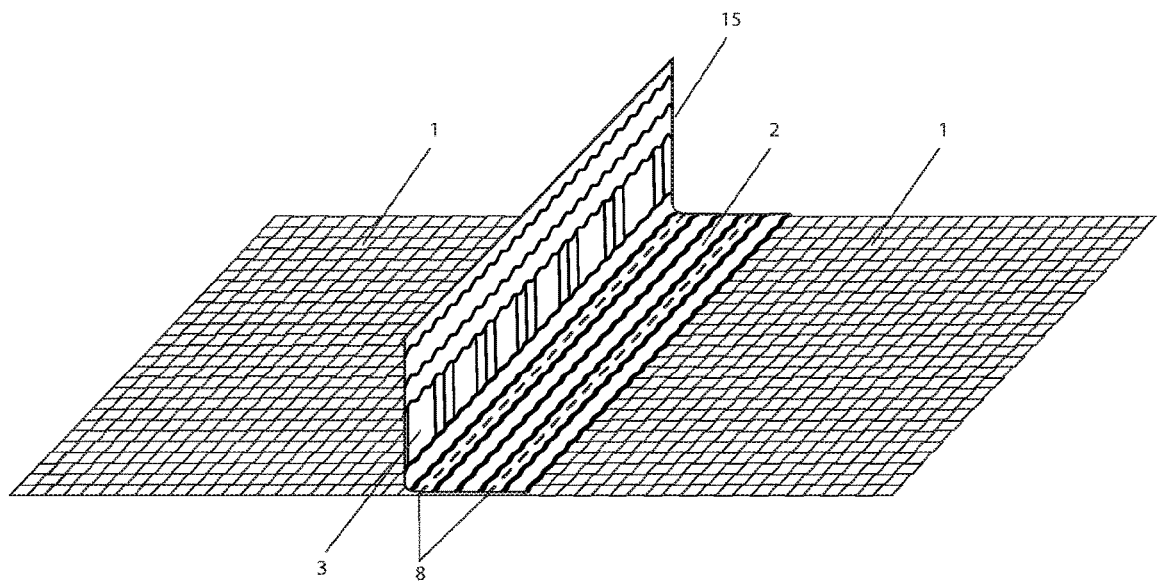
FIG. 2E is a schematic perspective illustration of a material of another embodiment of the invention showing one side of the material, the main body of the material is of plain weave construction and the knitted region is attached to the main body along one side of its length such that a flap is formed.

When the knitted region is attached at a region inset from the edges of the main body of the material, it may be attached along its length and primarily on one side (i.e. edge) of its length, such that the other side may form a flap to which fixing means may be attached. More specifically, and with reference to FIG. 2E, in some embodiments the knitted region 2 may be attached along a region intermediate of the width or distance between the edges of the material, and attached primarily along one side (in the illustration, the right side) of the length of the knitted region 2 such that the other side of its length may form a flap 15. The flap may include a row of eyelets 3. In the embodiment illustrated the knitted region has been affixed to the woven material by two lines of stitching 8.

Figure 2F:
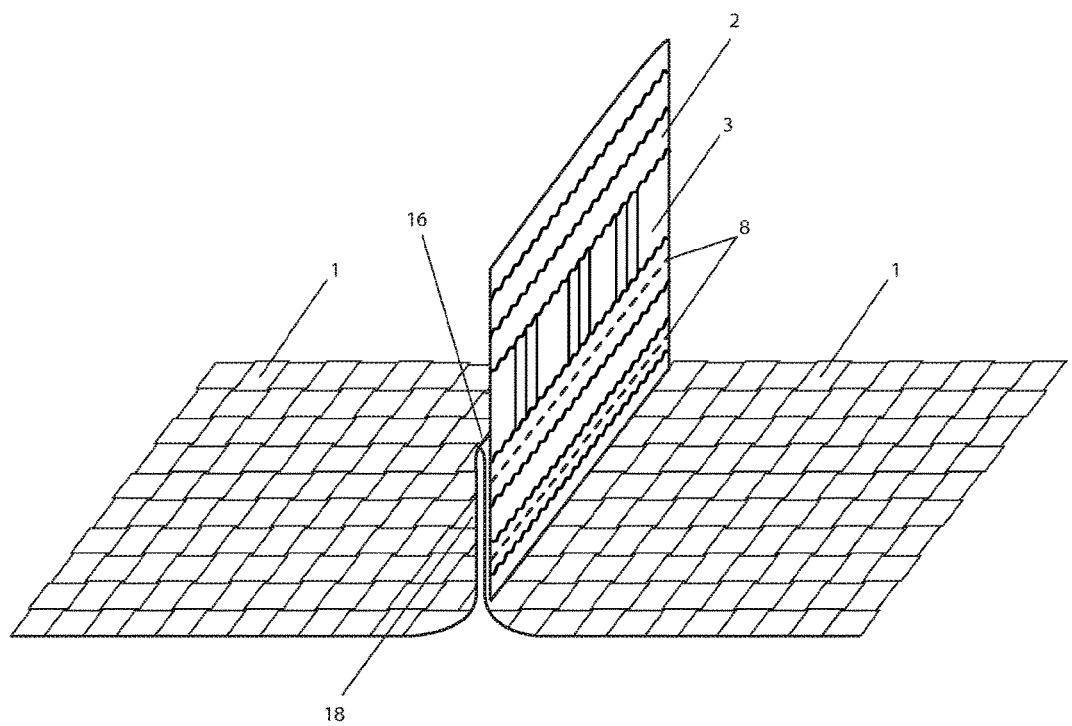
FIG. 2F is a schematic perspective illustration of a material of another embodiment of the invention showing one side of the material, the main body of the material is of plain weave construction and has been folded along a notional fold line to form a flap comprising two layers of main body material, and a knitted region has been attached to the flap.

In other embodiments, and with reference to FIG. 2F, the main body 1 of the material may be folded along a fold line 16 at a distance from an edge of the main body of the material to form a flap 18 in the main body of the material, the flap comprising two (or more) layers of the main body of the material and having an edge 16 extending along the main body of the material, and the knitted region 2 may be affixed to the flap. In some embodiments the flap may be proximate a perimeter edge of the main body of the material (e.g. within 5 mm to 100 mm of the edge), or the flap may be further away from the edge. The flap may include a row of eyelets 3. In the embodiment illustrated the knitted region has been affixed to the woven material by two lines of stitching 8, stitched through both layers of the flap 18. In other embodiments, just one line of stitching (e.g. the lower line shown in the FIG. 2F), may be used. Folding the main body of the material in such a manner doubles the thickness of the material along the region whereby the knitting regions is affixed, thereby increasing the strength of material in the region to which the knitted region is attached. The notional fold line along which the main body of the material is folded may extend in a lengthwise direction, or a widthwise direction, along the material.

In some embodiments, where the knitted region is attached to an edge region of the main body, an edge region of the main body may be folded back on itself to double the thickness of the main body where the knitted region is attached, thereby increasing the strength of the material in the region to which the knitted region is attached.

As illustrated in FIGS. 2A to 2C, the knitted region 2 comprises a row of eyelets 3, the eyelets being spaced apart along the length of the knitted region.

The eyelets 3 are formed as narrow openings (longer than they are wide). In some embodiments an eyelet may have a width of 2 mm to 5 mm wide, or 2 mm to 8 mm, or 2 mm to 12 mm, and a length of 2 mm to 20 mm, or 6 mm to 12 mm. In some embodiments the length of the eyelet is aligned with a longitudinal direction of the knitted region as shown in FIG. 2A. In some embodiments the eyelets have a length of about 10 mm, or about 11 mm, or about 12 mm, or about 13 mm, or about 14 mm or about 15 mm. In some embodiments the length of the eyelets is about equal to the spacing between adjacent eyelets, or the spacing between eyelets is between 2 and 20 mm, or about 10 mm, or about 11 mm, or about 12 mm, or about 13 mm, or about 14 mm or about 15 mm, or about 6 to 12 mm.

In some embodiments eyelets are provided in the knitted region in a row extending along the material. In some embodiments the row is a lengthwise or widthwise extending row. In some embodiments the eyelets are provided at a frequency of between 1 and 250, or between 10 and 150, or between 20 and 80, or between 20 and 60, or between 30 and 50, or about 40 eyelets per meter.

The part of the knitted region 2 that forms the eyelets may be of greater tear resistance or strength than the rest of the knitted region. This can provide additional structural support to the eyelets which are the portion of the material which receive the most weight loading. This additional strength is achieved through use of a knitting pattern of a different construction compared to the main body of the knitted region. In some embodiments this is achieved through use of a knit construction to form the eyelets which is of higher density that the knit construction of the main body of the knitted region. In some embodiments, the region forming the eyelets may comprise rectangular apertures and the main body of the knitted region may comprise one or more of hexagonal, diamond or triangular apertures. In some embodiments the region forming the eyelets may comprise a pillar knit pattern and the main body of the knitted region may comprise a non-pillar knit pattern, for example comprising one or more of hexagonal, diamond or triangular apertures. Other ways of increasing the strength of the knitted region forming the eyelets comprise using thicker or heavier weight threads, or using multi-strand threads.

Other embodiments do not comprise eyelets. Rather, the knitting is of a form with sufficient tear resistance such that a clamp may be fixed to the netting, or that a fixing means such as a cable tie may be passed through the netting structure, to enable the netting to be hung from a hanging structure, such as an overhead wire or post. The knitted region may comprise a region of stronger stitching, heavier weight threads, multi-strand threads and/or coloured threads to indicate preferred zones for attaching such fixing means.

Knitted Region—Double Layer

In some embodiments the knitted region is folded to form a double layer of the knitted material.

Figure 6B:
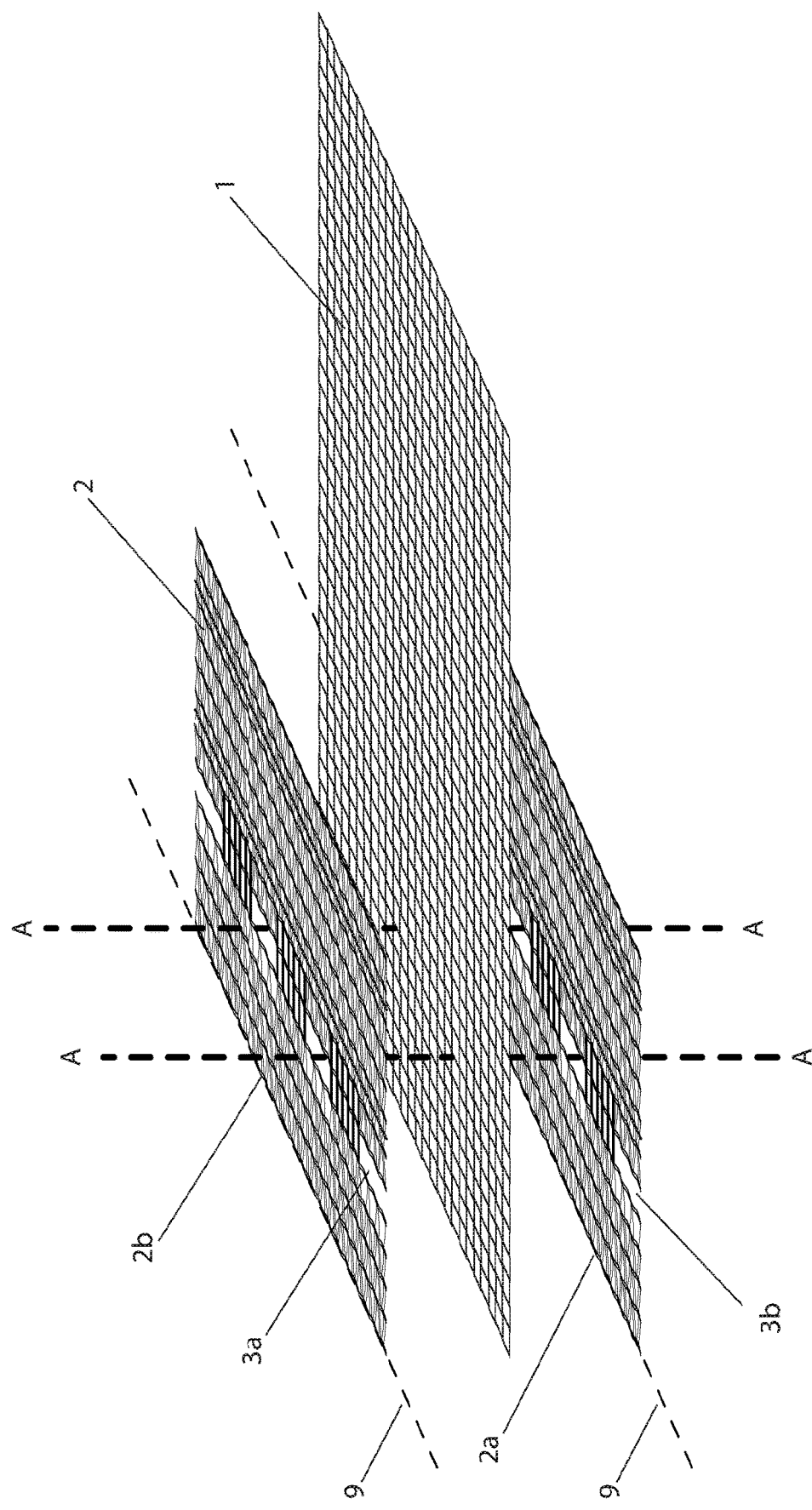
FIG. 6B is an exploded schematic illustration of the embodiment of FIGS. 6A(i) and 6A(ii)
Figure 6C:
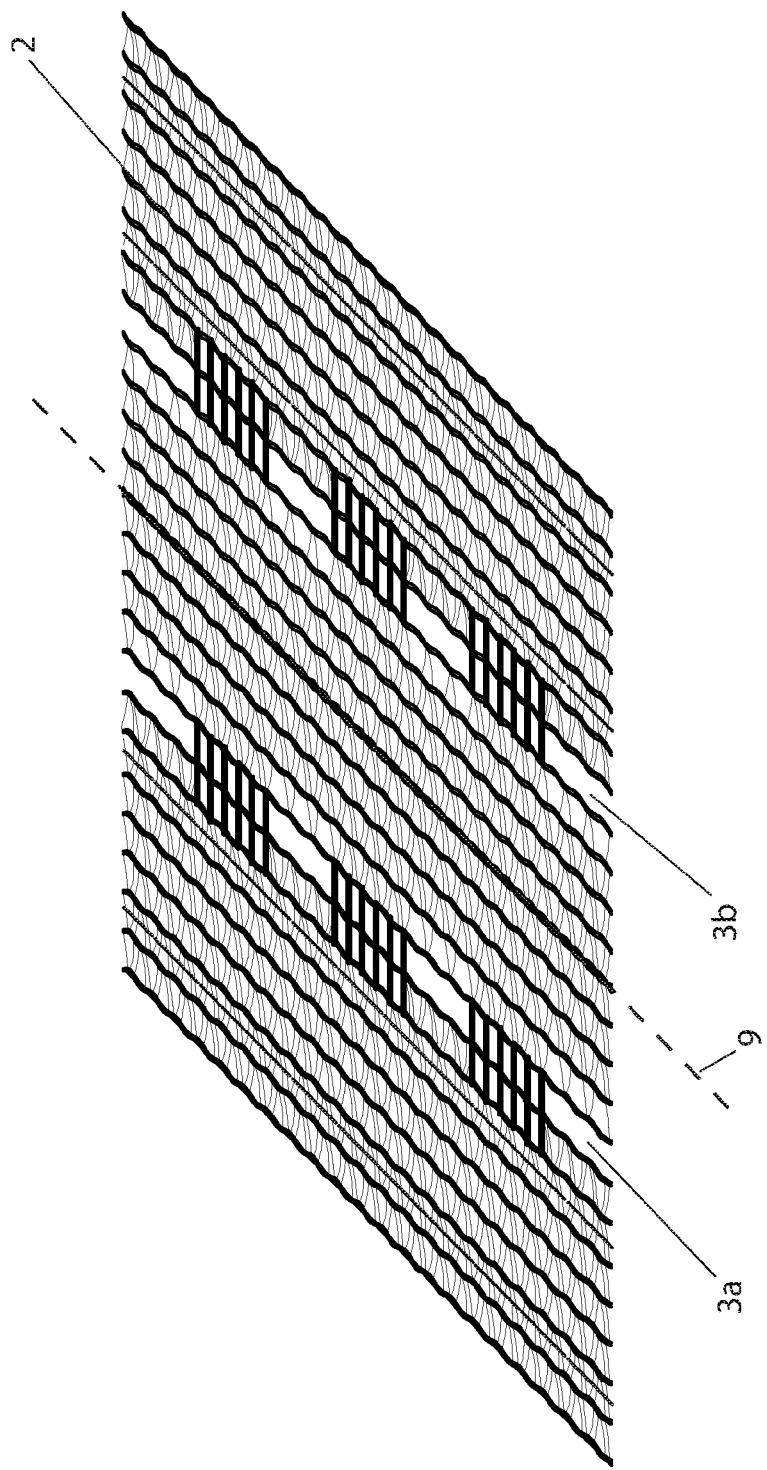
FIGS. 6C and 6D illustrate the folded knitted region (without the main body of the material in 6C) in a flat configuration before it has been folded (FIG. 6C) and a partially folded configuration (FIG. 6D) illustrating the knitted eyelets aligning.
Figure 6D:
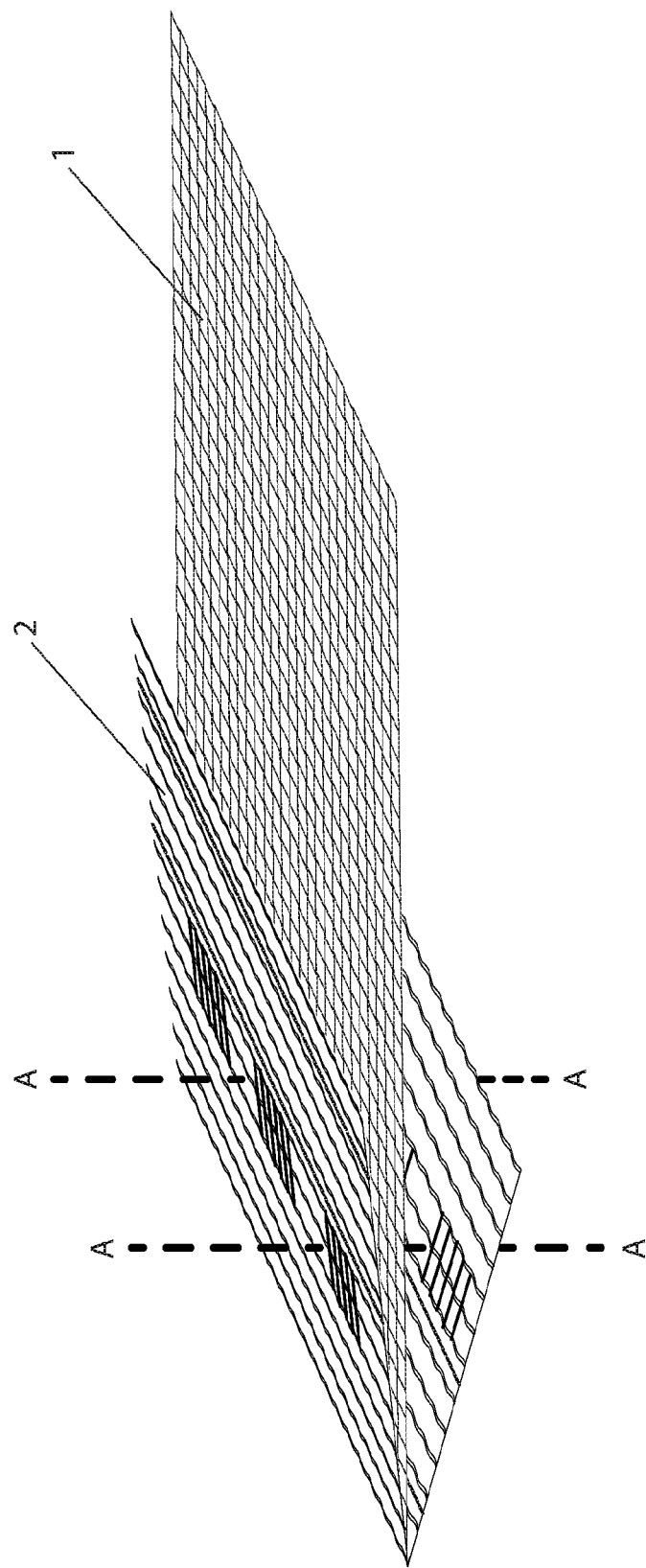

A folded knitted region is illustrated in FIGS. 6A(i) and 6A(ii) (only one side of the folded region can be seen in FIG. 6A(i)). The knitted region of the material illustrated in FIGS. 6A(i) and (ii) is similar to that of FIG. 2A, except in that in the embodiment of FIGS. 6A(i) and (ii) the knitted region is mirrored about a longitudinal fold line such that the knitted region when flat (i.e. before it has been affixed to the woven region) contains two rows of eyelets running longitudinally along the length of the knitted region. This is illustrated in FIG. 6C which shows the knitted region 2 laid flat, with two parallel rows of knitted eyelets 3a, 3b extending along the length of the material, either side of a notional fold line 9. FIG. 6D illustrates the knitted region 2 partly folded, to show how the knitted eyelets align when the knitted region of this embodiment is folded. Lines A-A indicate aligned eyelets. FIG. 6B is an exploded perspective view of the embodiment illustrated by FIG. 6A(i). For the purposes of the illustration, the knitted region has been split along what in use would be a fold line 9, but in practice the edges 2a, 2b of the knitted region as illustrated may be a continuous region of the knitted material, formed in a fold. The woven material forming the main body 1 of the material is sandwiched between the folded knitted region, and held in place by stitching that fastens the three layers (i.e. the three layers being comprised of the folded knitted region forming two layers plus woven region forming a layer) together. The woven material may be located butted up to the fold (i.e. butted up to the fold line 9) of the folded knitted region, whereby additional holes (eyelets) need to be made or penetrated through the main body of the material to enable fixings to be secured through the knitted eyelets. Butting the woven material up to the fold of the knitted material may facilitate manufacture of the product, as the fold can be used to assist in aligning the sewing points. Alternatively, the main body of the material may be set back from the fold line such that the rows of eyelets remain clear of woven material, and is stitched to the main body of the material through the section of the knitted material that does overlap on either side of the woven material. FIG. 6B also illustrates the two rows of eyelets 3a, 3b aligning along their length, each pair of aligned eyelets forming an aperture that may extend right though the folded knitted region. Two of such apertures are illustrated by lines A-A in FIG. 6B.

In an alternative embodiment, the woven region may be stitched to one or other of top side or bottom side of the knitted region (i.e. the woven material is located outside of the fold), instead of inside the fold.

In some embodiments, where the folded knitted region is attached about an edge region of the main body of the material, an edge region of the main body may also be folded back on itself to double the thickness of the main body where the folded knitted region is attached, thereby increasing the strength of the material in the region to which the knitted region is attached.

In an alternative embodiment, the knitted region is folded as above, but contains no eyelets. Any fixing means is passed though the knitted material itself rather than though an eyelet.

In some embodiments the knitted region is attached along a region that is intermediate to the edges of the material, for example attached to a lengthwise extending central region of the material. This arrangement may be used, for example, to suspend a lengthwise extending central portion of the material higher than the lateral edges, such that rain will run off the material.

Figure 7A:
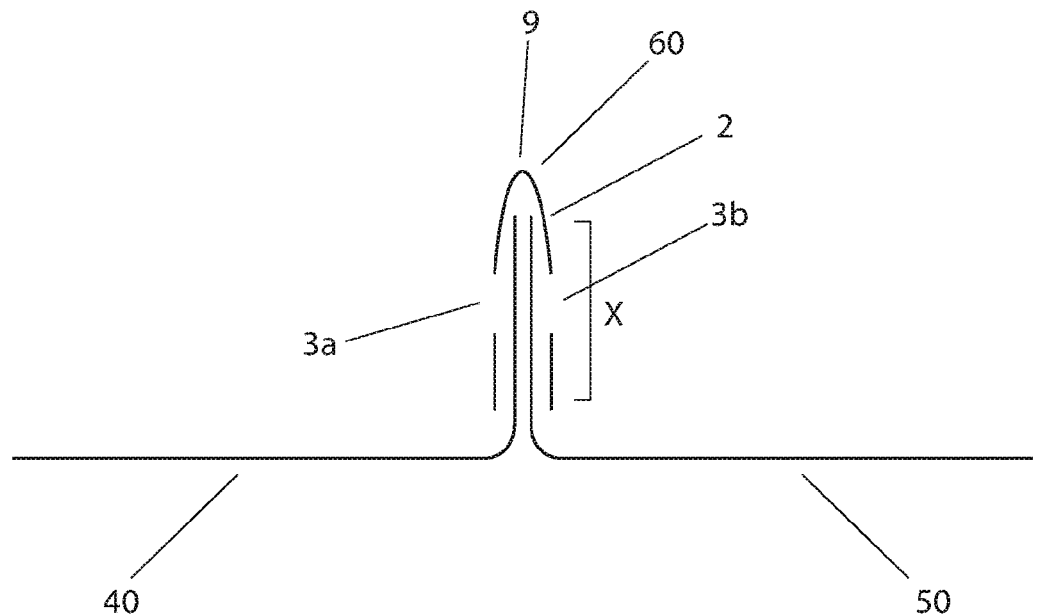
FIG. 7A is a schematic cross-section illustration of another embodiment of the invention, showing a material formed of two lengths of woven material joined with a folded knitted region to form a single length of material having a region for attaching fixing means between the lateral edges of the material.

In some embodiments where the knitted region is attached along a region that is intermediate between the edges of the material, and with reference to FIG. 7A, the knitted region is folded along a longitudinal fold line 9 such that the two rows of eyelets 3a, 3b align along their length, in the same manner as described above, but instead of being folded around the edge of and sandwiching just one length of woven material, the knitted region is folded around the edges of, and sandwiches, edges of two lengths of woven material 40, 50, such that the two lengths of material may be joined along opposing edge regions. In such an embodiment the two lengths of woven material are arranged such that the portions of their edge regions located (or sandwiched) inside the folded knitted region lie adjacent one another, and are held in place by stitching that fastens the four layers (i.e. the four layers being comprised of the folded knitted region forming two layers plus the two woven regions forming two layers) together. More specifically, in FIG. 7A, length of first woven material 40 and length of second woven material 50 are joined by a folded knitted region 60 that sandwiches edge regions of the first and second edge regions. All four layers of the "sandwich" are stitched together to join the lengths of material. Some embodiments do not have eyelets in the knitted region, in which case fixing means may be passed directly though the knitted region itself in the section designated with the letter "X". Optionally, the knitted region 60 may contain rows of aligned eyelets 3*a*, 3*b* in the section designated with the letter "X" to facilitate the passing of fixing means though this section of the material, or the fixing means may be passed directly though the knitted material itself.

FIG. 7C is a schematic perspective view of a material including two edge regions joined together as illustrated in FIG. 7A, and also illustrating folded knitted regions attached at opposing lengthwise extending edges of the material.

Figure 7B:
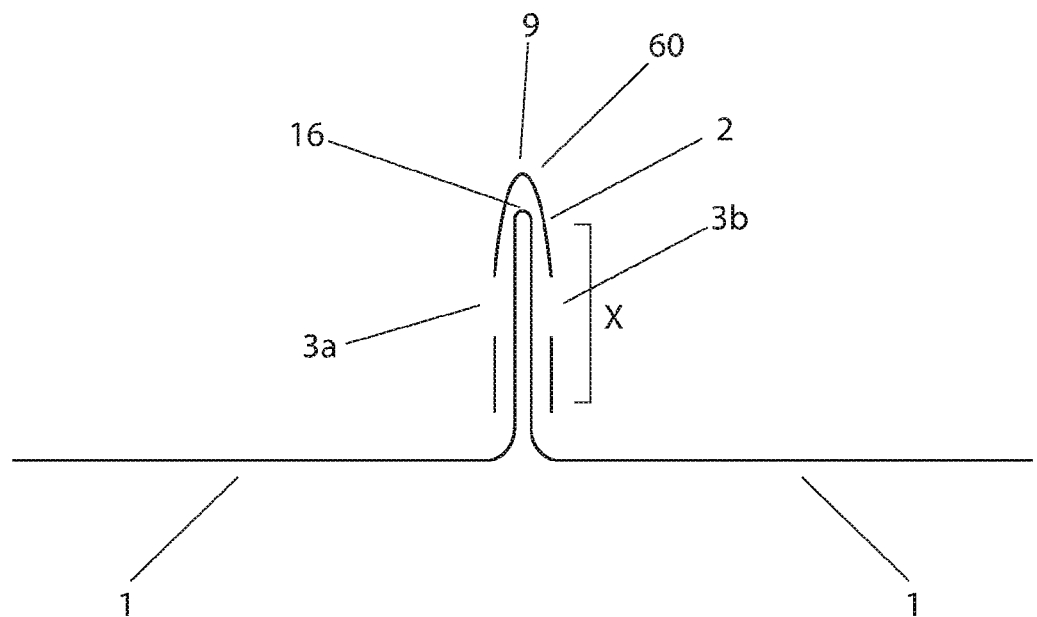
FIG. 7B is a schematic cross-section illustration of another embodiment of the invention, showing an attachment region formed in the centre of a length of material, the attachment region formed by a fold in the material and a folded knitted region attached such that it sandwiches the fold.

In other embodiments, and with reference to FIG. 7B, the main body 1 of the material may be folded along a notional fold line at a distance from an edge of the main body of the material to form a flap in the main body of the material, the flap having an edge 16 extending along the main body of the material. The knitted region, folded about a fold line 9 of its own, may be affixed such that it sandwiches the flap. Folding the main body of the material in such a manner doubles the thickness of the material along the region whereby the knitting region is affixed, thereby increasing the strength of material in the region to which the knitted region is attached. The fold line along which the main body of the material is folded may extend in a lengthwise direction along the material. In the same manner as described above, fixing means may be passed though the knitted region in the section designated with the letter "X". Optionally, the knitted region 60 may contain rows of aligned eyelets 3*a*, 3*b* in the section designated with the letter "X" to facilitate the passing of fixing means though this section of the material, or the fixing means may be passed directly though the knitted material itself.

Figure 7D:
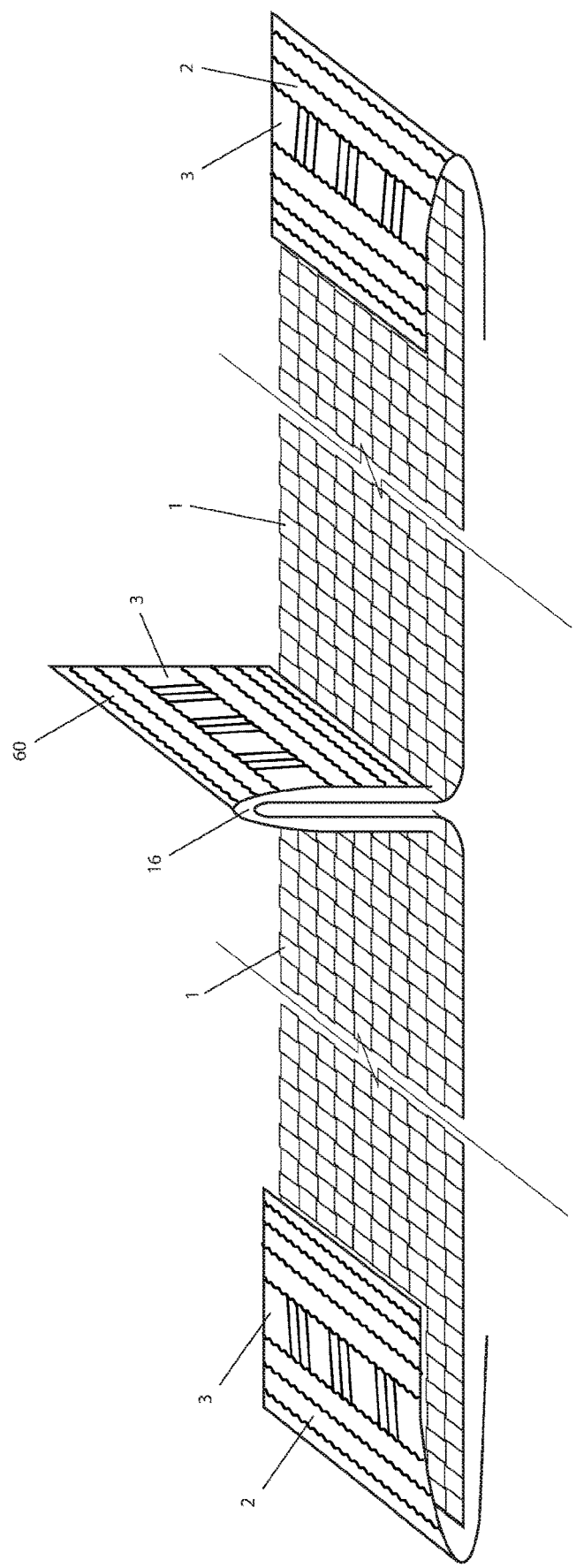
FIG. 7D is a schematic illustration showing a perspective view of the material illustrated in FIG. 7B.

FIG. 7D is a schematic perspective view of the material illustrated in FIG. 7B, and showing the folded knitted region 60 sandwiching a flap formed about a fold line 16 in the main body 1 of the material. Optionally, the main body of the material may be folded along a fold line extending generally parallel with and proximate to an outer edge of the main body of the material such that the edge of the main body of the material is folded back on itself (not illustrated), that is, in a manner similar to a hem. In such a configuration the main body of the material has two layers at an edge to which a knitted region may be stitched. As already discussed above, stitching a knitted region to a double layer of main body material may increase the security of attachment between the two.

In some embodiments where the knitted region is attached along a region that is intermediate to the edges of the material (and where it is not being used to join two lengths of material), the knitted region is stitched along one side of its length, leaving the other side of its length to constitute a flap through which fixing means may be fixed.

In Use

In use, the material may be hung or held in place via a wire (or rope or cable) threaded through the eyelets of knitted region or held in place via a fixing means (such as clamps, cable ties or hooks) attached through or against the kitted region. The material may be hung from an overhead wire and/or anchored to the ground and/or vertical posts either directly or via a wire. Load or force applied to the section of the knitted region where those fixings are attached, either by the weight of the material itself or by wind load against the material, is distributed more evenly across the woven part of the material than it would be if the fixings were attached directly to the woven part of the material itself. This means that the woven material is much less likely to pull apart or bruise or have areas of strain that later become weakened areas that lead to product failure than it would otherwise.

The material may be employed for any one of a variety of uses, including uses involving locating the material beneath plants (such as ground cover materials) or suspending it above plants. When suspended above plants, and with reference to FIG. 8B, the material may be suspended via a knitted region located along the length of a centre region of a rectangular or oblong material and also suspended via knitted regions located along the lengthwise extending edges 41*a*, 41*b* of such a material. In such an arrangement the fixing means (not shown) are attached to the knitted regions and the material may be suspended in a generally inverted "V" arrangement. This configuration can be particularly useful for rain exclusion.

In an alternative installation, the material lies generally in a single plane (rather than two planes as is the case for an inverted "V") and is suspended by knitted regions located along the lengthwise extending edges of the material. The material may be located above or beside a row of plants between the plant and the sun. For example, in a row of plants located in the northern hemisphere and running east-west, the material may be located to extend along the length of the row of plants, on the southern side of the row, at an angle measured across its width of approximately 30° from horizontal such that the more southern lengthwise extending edge is lower than its opposing edge. Such an arrangement can be particularly useful to provide shading from the sun.

Figure 8A:
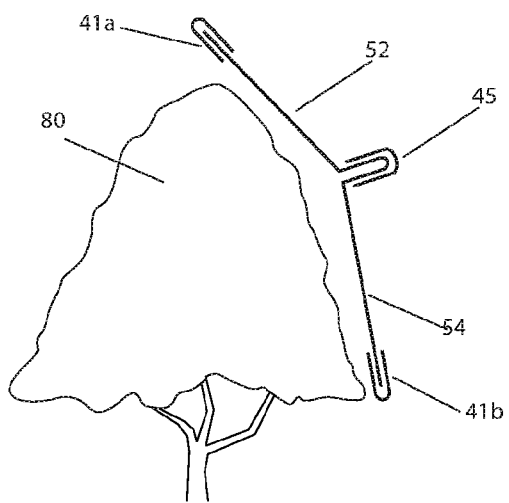
FIG. 8A is a schematic cross section of an embodiment of the invention installed to shade fruit trees on the sun side of the trees.
Figure 8B:
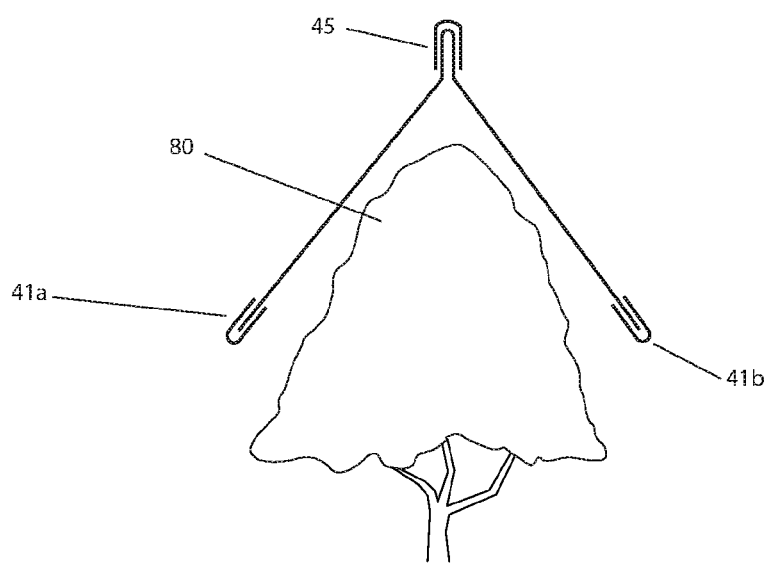
FIG. 8B is a schematic cross section of an embodiment of the invention being used to provide rain protection to fruit trees.

In a further alternative installation, and with reference to FIG. 8A the installation may comprise a length of material suspended above and/or beside a row of plants 80. The material may be arranged such that it resides in two general planes, with an upper region 52 of the material lying in an upper plane and a lower region 54 of the material lying in a lower plane, both planes extending along the length of the row but at different angles. For example, with reference to the cross-sectional representation of FIG. 8A, the upper region of the material resides in a plane having an angle of approximately 55° from horizontal, measured across the materials width. The lower edge of that plane ends at a section of the material intermediate its two lateral edges 41*a*, 41*b*. The lower region of the material 54 lies in a plane which is angled back towards the row of plants.

Alternatively, the lower region of the material may hang vertically, or be angled away from the row of plants. At the juncture of the upper and lower regions of the material is a flap 40, the flap formed by folding the material about a notional fold line that extends lengthwise along the material. The flap may be formed at the center of the width of the material, or it may be off-centre and closer to one of the lengthwise extending peripheral edges. Attached to the flap is a folded knitted region, attached such that it sandwiches the flap. The peripheral lengthwise extending edges 41*a*, 41*b* of the material also each have a folded knitted region attached thereto. The three lengthwise extending knitted regions (i.e. the two edge regions plus the knitted region intermediate the edges, each extending lengthwise along the material) form attachment regions to which fixing means (such as C clips or carbine clips) may be attached to locate and hold the material in place. Such an arrangement may also be useful for providing shade from the sun. For example, the material may be located above/beside a row of plants between the plants and the sun. For example, in a row of plants located in the northern hemisphere and running east-west, the material may be located to extend along the length of the row of plants, on the southern side of the row.

In some embodiments, the invention may be installed as part of a material forming a vertically oriented wind screen (i.e. installed to lie in a vertical plane). In such embodiments, the knitted region may extend along the length of the top of the windscreen with either fastening means attached directly to the knitted region or a wire threaded through eyelets located in the knitted region to suspend the material in place. Optionally, another knitted region may extend along the length of the bottom of the windscreen to provide similar means of fixing in place the bottom edge of the material.

In this specification, diffuse transmittance and diffuse reflectance data is measured of filaments or tapes themselves of the netting or ground cover material. For filaments, filaments are aligned side by side with no (or minimal) gaps between them to create a surface area large enough for a monochromatic beam to focus upon. The method of measurement is described below. Diffuse reflectance and diffuse transmittance of a region of netting or ground cover material as a whole can be calculated by determining the proportion of area covered by the tapes or filaments versus that not covered by tapes or filaments.

The spectrophotometer system is based around a GSA/McPherson 2051 1 metre focal length monochromator fitted with a prism predisperser and also stray light filters. The light source is a current regulated tungsten halogen lamp. The bandwidth is adjustable up to 3 nm. The monochromatic beam from the monochromator is focused onto the sample or into the integrating sphere using off-axis parabolic mirrors. The integrating spheres are coated with pressed halon powder (PTFE powder). Halon powder is also used as a white reflectance reference material. The detector is usually a silicon photodiode connected to an electrometer amplifier and digital volt meter. The whole system is controlled using software written in LabVIEW. The detectors used can be photomultiplier tubes, silicon diodes or lead sulphide detectors.

Diffuse Reflectance

Diffuse reflectance is measured using an integrating sphere with an internal diameter of 75 mm with the sample tilted at an angle of 6° to the incident light (specular reflectance included). The reference sample is pressed halon powder and a black cone is used to correct for stray light. Up to four test samples are mounted on a pneumatic driven sample changer along with the white reference and black cone.

Diffuse Transmittance

Diffuse transmittance is measured using an integrating sphere with an internal diameter of 120 mm and coated with pressed halon powder. The sample is mounted on one port and the incident light port is at an angle of 90° around the sphere. The sphere rotates by 90° in the horizontal plane to allow the focused incident light to enter the sphere through the incident light port or the incident light to be transmitted through the sample and enter the sphere. The detector is mounted at the top of the sphere.

Absorbance

Absorbance is calculated as a back calculation from the calculated transmittance and reflectance values.

The embodiments described above may also be said broadly to consist in the parts, elements and features referred to or indicated in the specification of the application, individually or collectively, and any or all combinations of any two or more said parts, elements or features, and where specific integers are mentioned herein which have known equivalents in the art to which the embodiments relate, such known equivalents are deemed to be incorporated herein as of individually set forth.

The foregoing describes the invention including preferred forms thereof. Alterations and modifications as will be obvious to those skilled in the art are intended to be incorporated in the scope hereof, as defined in the accompanying claims.

The invention claimed is:

1. A woven sheet crop material comprising a woven region and a smaller knitted region, said woven region comprising a main body of the material, said knitted region affixed to said woven region and providing an affixment region for attachment of fixing means, and said knitted region is folded around an edge part of said woven region.

2. A woven sheet crop material as claimed in claim 1 wherein said knitted region is attached along an edge region of the main body of the material and wherein said edge region of the main body has been folded back upon itself to form a double layer, or more than double layer, of the edge region of the main body and said knitted region is attached to said double layer, or more than double layer, of the edge region of the main body.

3. A woven sheet crop material as claimed in claim 1 wherein said knitted region comprises a row of eyelets.

4. A woven sheet crop material as claimed in claim 1 wherein the knitted region has a pillar knitted construction comprising pillars arranged longitudinally of the length of the knitted region, and eyelets are formed between adjacent pillars.

5. A woven sheet crop material as claimed in claim 1 wherein said main body comprises two lengths of woven material joined along opposing edge regions, and said knitted region is fixed to, or forms part of the joining of, said opposing edge regions.

6. A woven sheet crop material comprising a woven region and a smaller knitted region, said woven region comprising a main body of the material said knitted region affixed to said woven region and providing an affixment region for attachment of fixing means, said knitted region is attached along the main body intermediate between edges of the main body, said knitted region is folded around a part of said woven region intermediate between the edges of the main body region, and wherein a part of the main body region is a folded part of the main body region forming a flap along the main body of the material.

7. A woven sheet crop material as claimed in claim 6 wherein said knitted region is attached along an edge region of the main body of the material and wherein said edge region of the main body has been folded back upon itself to form a double layer, or more than double layer, of the edge region of the main body and said knitted region is attached to said double layer, or more than double layer, of the edge region of the main body.

8. A woven sheet crop material as claimed in claim 6 wherein said knitted region comprises a row of eyelets.

9. A woven sheet crop material as claimed in claim 6 wherein the knitted region has a pillar knitted construction comprising pillars arranged longitudinally of the length of the knitted region, and eyelets are formed between adjacent pillars.

10. A woven sheet crop material as claimed in claim 6 wherein said main body comprises two lengths of woven material joined along opposing edge regions, and said knitted region is fixed to, or forms part of the joining of, said opposing edge regions.

11. A woven sheet crop material comprising a woven region and a smaller knitted region, said woven region comprising a main body of the material, said knitted region affixed to said woven region and providing an affixment region for attachment of fixing means, and said knitted region is a single (i.e. not folded) layer of knitted material.

12. A woven sheet crop material as claimed in claim 11 wherein said knitted region is attached along an edge region of the main body of the material.

13. A woven sheet crop material as claimed in claim 12 wherein said knitted region comprises a row of eyelets.

14. A woven sheet crop material as claimed in claim 12 wherein said knitted region is attached along an edge region of the main body of the material and wherein said edge region of the main body has been folded back upon itself to form a double layer, or more than double layer, of the edge region of the main body and said knitted region is attached to said double layer, or more than double layer, of the edge region of the main body.

15. A woven sheet crop material as claimed in claim 12 wherein the knitted region has a pillar knitted construction comprising pillars arranged longitudinally of the length of the knitted region, and eyelets are formed between adjacent pillars.

16. A woven sheet crop material as claimed in claim 12 wherein said main body comprises two lengths of woven material joined along opposing edge regions, and said knitted region is fixed to, or forms part of the joining of, said opposing edge regions.

17. A woven sheet crop material as claimed in claim 11 wherein said knitted region is attached along an edge region of the main body of the material and wherein said edge region of the main body has been folded back upon itself to form a double layer, or more than double layer, of the edge region of the main body and said knitted region is attached to said double layer, or more than double layer, of the edge region of the main body.

18. A woven sheet crop material as claimed in claim 11 wherein said knitted region comprises a row of eyelets.

19. A woven sheet crop material as claimed in claim 11 wherein the knitted region has a pillar knitted construction comprising pillars arranged longitudinally of the length of the knitted region, and eyelets are formed between adjacent pillars.

20. A woven sheet crop material as claimed in claim 11 wherein said main body comprises two lengths of woven material joined along opposing edge regions, and said knitted region is fixed to, or forms part of the joining of, said opposing edge regions.

21. A woven sheet crop material comprising woven region and a smaller knitted region, said woven region comprising a main body of the material, said knitted region affixed to said woven region and providing an affixanent region for attachment of fixing means, and said knitted region comprises knitted material on opposite surfaces of the woven region, with eyelets in the knitted material on opposite surfaces of the woven region which align.

22. A woven sheet crop material as claimed in claim 21 wherein said knitted region is attached along an edge region of the main body of the material and wherein said edge region of the main body has been folded back upon itself to form a double layer, or more than double layer, of the edge region of the main body and said knitted region is attached to said double layer, or more than double layer, of the edge region of the main body.

23. A woven sheet crop material as claimed in claim 21 wherein said knitted region comprises a row of eyelets.

24. A woven sheet crop material as claimed in claim 21 wherein the knitted region has a pillar knitted construction comprising pillars arranged longitudinally of the length of the knitted region, and eyelets are formed between adjacent pillars.

25. A woven sheet crop material as claimed in claim 21 wherein said main body comprises two lengths of woven material joined along opposing edge regions, and said knitted region is fixed to, or forms part of the joining of, said opposing edge regions.

26. A method of enhancing the growth or development of a plant, or fruit thereon, comprising installing and maintaining a woven sheet crop material as claimed in claim 1 either above, beside, or beneath said plant such that said material influences the environmental conditions in which the plant is growing.

\* \* \* \* \*

UNITED STATES PATENT AND TRADEMARK OFFICE
CERTIFICATE OF CORRECTION

PATENT NO.         : 10,750,680 B2                                                  Page 1 of 1
APPLICATION NO.    : 15/739448
DATED              : August 25, 2020
INVENTOR(S)        : Jonathan Dallas Toye It is certified that error appears in the above-identified patent and that said Letters Patent is hereby corrected as shown below:

In the Claims

Column 24, Claim 6, Line 39:
"the material said knitted" should read --the material, said knitted--.

Column 26, Claim 21, Line 9:
"comprising woven region" should read --comprising a woven region--.

Column 26, Claim 21, Line 12:
"an affix anent region" should read --an affixment region--.

Signed and Sealed this
Twenty-sixth Day of January, 2021

Drew Hirshfeld
*Performing the Functions and Duties of the
Under Secretary of Commerce for Intellectual Property and
Director of the United States Patent and Trademark Office*